(12) United States Patent  (10) Patent No.: US 9,110,247 B2
Ho et al.  (45) Date of Patent: Aug. 18, 2015

(54) IMAGING LENS AND PORTABLE ELECTRONIC APPARATUS HAVING THE SAME

(71) Applicant: Genius Electronic Optical Co., Ltd., Taichung (TW)

(72) Inventors: Wang-Ting Ho, Taichung (TW); Shih-Han Chen, Taichung (TW); Jun-Guang Zhang, Taichung (TW); Yi-Ta Chiang, Taichung (TW)

(73) Assignee: GENIUS ELECTRONIC OPTICAL CO., LTD. (TW)

( * ) Notice: Subject to any disclaimer, the term of this patent is extended or adjusted under 35 U.S.C. 154(b) by 68 days.

(21) Appl. No.: 13/891,454

(22) Filed: May 10, 2013

(65) Prior Publication Data

US 2014/0184872 A1  Jul. 3, 2014

(30) Foreign Application Priority Data

Dec. 28, 2012 (CN) .......................... 2012 1 0583409

(51) Int. Cl.
*G02B 13/18* (2006.01)
*G02B 9/34* (2006.01)
*G02B 13/00* (2006.01)

(52) U.S. Cl.
CPC ................ *G02B 9/34* (2013.01); *G02B 13/004* (2013.01); *G02B 13/0015* (2013.01)

(58) Field of Classification Search
CPC .............. G02B 9/00; G02B 9/34; G02B 9/05; G02B 13/00; G02B 13/001; G02B 13/0015; G02B 13/0046
USPC ......................................... 359/715, 771–773
See application file for complete search history.

(56) References Cited

U.S. PATENT DOCUMENTS 7,453,654 B2  11/2008  Shinohara
7,535,659 B2 *  5/2009  Sano ............................. 359/773

(Continued)

FOREIGN PATENT DOCUMENTS

CN  201383029 Y  1/2010
CN  102411190 A  4/2012

(Continued)

OTHER PUBLICATIONS

Search Report appended in an Office Action issued to Chinese counterpart application No. 201210583409.1 by the State Intellectual Property Office of the PRC on Aug. 28, 2014 along with an English translation.

(Continued)

*Primary Examiner* — Thong Nguyen
(74) *Attorney, Agent, or Firm* — Baker & McKenzie LLP

(57) ABSTRACT

An imaging lens includes first, second, third, and fourth lens elements arranged from an object side to an image side in the given order. The first lens element has a positive refractive power, and both of the object-side and image-side surfaces thereof have a convex portion near an optical axis of the imaging lens. The object-side and image-side surfaces of the second lens element respectively have a convex portion and a concave portion near the optical axis. The fourth lens has a negative refractive power, and the object-side surface thereof has a concave portion near the optical axis. The imaging lens satisfies $EFL/CT1 \geq 5.3$, where EFL is an effective focal length of the imaging lens, and CT1 is a thickness of the first lens element.

10 Claims, 31 Drawing Sheets

(56) References Cited

U.S. PATENT DOCUMENTS

| | | | |
|---|---|---|---|
| 8,102,608 B2 | 1/2012 | Taniyama | |
| 2008/0130140 A1* | 6/2008 | Shin | 359/773 |
| 2008/0266670 A1 | 10/2008 | Liao | |
| 2009/0015944 A1* | 1/2009 | Taniyama | 359/773 |
| 2012/0307135 A1* | 12/2012 | Iba et al. | 348/360 |

FOREIGN PATENT DOCUMENTS

| | | |
|---|---|---|
| CN | 102460264 A | 5/2012 |
| CN | 102754008 A | 10/2012 |
| JP | 2007-286153 A | 11/2007 |
| JP | 2008-046526 A | 2/2008 |
| JP | 2008-242180 A | 10/2008 |
| JP | 2009-020182 | 1/2009 |
| JP | 2009-047836 | 3/2009 |
| JP | 2009-098516 | 5/2009 |
| JP | 2011-232772 | 11/2011 |
| JP | 2012-068355 | 4/2012 |
| TW | M354075 U | 4/2009 |
| TW | M354080 U | 4/2009 |
| TW | M356117 U | 5/2009 |
| TW | M356917 U | 5/2009 |
| TW | M360372 U | 7/2009 |
| TW | I324262 B | 5/2010 |
| TW | 201209472 A | 3/2012 |
| TW | 201215910 A | 4/2012 |
| WO | 2011/052370 A1 | 5/2011 |
| WO | 2011/096193 A1 | 8/2011 |

OTHER PUBLICATIONS

Search Report appended in an Office Action issued to Taiwanese Counterpart Application No. 102111153 by the Taiwan Intellectual Property Office on Aug. 6, 2014 along with an English translation.

* cited by examiner

| lens element | surface | radius of curvature | thickness | refractive index | Abbe number | material | focal length |
|---|---|---|---|---|---|---|---|
| \multicolumn{8}{l}{system focal length =2.80mm, half field-of-view =31.255°, F-number =2.0, system length=3.75mm} |
| object | | ∞ | ∞ | | | | |
| first lens element 3 | object-side surface 31 | 2.337329 | 0.289 | 1.544 | 56.1143 | plastic | 3.463 |
| | image-side surface 32 | -9.45353 | 0.05 | | | | |
| aperture stop 2 | | ∞ | 0 | | | | |
| second lens element 4 | object-side surface 41 | 1.613541 | 0.198 | 1.639729 | 23.5288 | plastic | -5.009 |
| | image-side surface 42 | 1.024164 | 0.25 | | | | |
| third lens element 5 | object-side surface 51 | -2.97726 | 0.452 | 1.544 | 56.1143 | plastic | 2.234 |
| | image-side surface 52 | -0.91173 | 0.04 | | | | |
| fourth lens element 6 | object-side surface 61 | -23.9865 | 0.281 | 1.639729 | 23.5288 | plastic | -6.496 |
| | image-side surface 62 | 5.096453 | 0.3 | | | | |
| Optical filter 7 | object-side surface 71 | ∞ | 0.21 | | | | |
| | image-side surface 72 | ∞ | 1.678 | | | | |
| Image plane 8 | | ∞ | | | | | |

FIG. 2

| surface | 31 | 32 | 41 | 42 | 51 | 52 | 61 | 62 |
|---|---|---|---|---|---|---|---|---|
| K | 0.00E+00 | 0.00E+00 | 0.00E+00 | 0.00E+00 | 0.00E+00 | 0.00E+00 | 0.00E+00 | 0.00E+00 |
| $a_4$ | 1.18E-02 | 1.60E-01 | -6.29E-01 | -9.95E-01 | -2.58E-01 | 2.97E-01 | 2.21E-01 | 7.18E-02 |
| $a_6$ | 1.84E-01 | -1.25E+00 | -4.26E-01 | 5.33E-01 | -3.81E-01 | -8.63E-01 | -9.10E-01 | -6.52E-01 |
| $a_8$ | -1.10E+00 | 2.63E+00 | 1.61E+00 | -2.68E-01 | 7.44E-01 | 3.03E+00 | 1.96E+00 | 1.31E+00 |
| $a_{10}$ | 1.03E+00 | -3.01E+00 | -8.82E-01 | -5.17E-01 | 2.69E+00 | -3.79E+00 | -2.19E+00 | -1.23E+00 |
| $a_{12}$ | 8.94E-02 | 1.86E+00 | -1.19E+00 | 7.25E-01 | -2.77E+00 | 2.91E+00 | 8.92E-01 | 4.31E-01 |

FIG. 3 system focal length =2.40mm, half field-of-view =35.304°, F-number =2.2, system length =3.18mm

| lens element | surface | radius of curvature | thickness | refractive index | Abbe number | material | focal length |
|---|---|---|---|---|---|---|---|
| object | | ∞ | ∞ | | | | |
| aperture stop 2 | | ∞ | -0.06848 | | | | |
| first lens element 3 | object-side surface 31 | 1.943071 | 0.289 | 1.544 | 56.1143 | plastic | 2.057 |
| | image-side surface 32 | -2.521578 | 0.05 | | | | |
| second lens element 4 | object-side surface 41 | 1.740165 | 0.198 | 1.639 | 23.5288 | plastic | -2.561 |
| | image-side surface 42 | 0.8093874 | 0.25 | | | | |
| third lens element 5 | object-side surface 51 | -2.93543 | 0.452 | 1.544 | 56.1143 | plastic | 1.918 |
| | image-side surface 52 | -0.813662 | 0.04 | | | | |
| fourth lens element 6 | object-side surface 61 | -15.0461 | 0.281 | 1.544 | 56.1143 | plastic | -5.205 |
| | image-side surface 62 | 3.526454 | 0.3 | | | | |
| Optical filter 7 | object-side surface 71 | ∞ | 0.21 | | | | |
| | image-side surface 72 | ∞ | 1.11208 | | | | |
| Image plane 8 | | ∞ | | | | | |

FIG. 6

| surface | 31 | 32 | 41 | 42 | 51 | 52 | 61 | 62 |
|---|---|---|---|---|---|---|---|---|
| K | 0.00E+00 | 0.00E+00 | 0.00E+00 | 0.00E+00 | 0.00E+00 | 0.00E+00 | 0.00E+00 | 0.00E+00 |
| $a_4$ | -3.05E-02 | 4.47E-01 | -4.44E-01 | -1.01E+00 | 1.51E-01 | 4.42E-01 | -3.95E-02 | -3.49E-01 |
| $a_6$ | 4.99E-01 | -1.22E+00 | -3.20E-01 | 3.79E-01 | 2.74E-02 | 6.91E-02 | -5.76E-01 | 1.04E-01 |
| $a_8$ | -1.77E+00 | 1.89E+00 | 5.49E-02 | -3.21E-02 | 9.15E-01 | -2.31E-01 | -4.40E-01 | -8.74E-02 |
| $a_{10}$ | 1.06E-01 | -1.46E+00 | 2.66E+00 | -1.00E+00 | 1.60E-01 | 4.99E-02 | 2.23E+00 | 3.38E-02 |
| $a_{12}$ | 5.85E+00 | 5.70E+00 | -1.26E+00 | -1.13E+00 | -1.82E+00 | 3.78E+00 | -2.36E+00 | -2.85E-02 |

FIG. 7

| system focal length =2.30mm, half field-of-view =36.417°, F-number =2.2, system length =3.20mm | | | | | | |
|---|---|---|---|---|---|---|
| lens element | surface | radius of curvature | thickness | refractive index | Abbe number | material | focal length |
| object | | ∞ | ∞ | | | | |
| first lens element 3 | object-side surface 31 | 2.832207 | 0.289 | 1.544 | 56.1143 | plastic | 2.242 |
| | image-side surface 32 | -2.07791 | 0.05 | | | | |
| aperture stop 2 | | ∞ | 0 | | | | |
| second lens element 4 | object-side surface 41 | 1.40345 | 0.198 | 1.639 | 23.528 | plastic | -2.538 |
| | image-side surface 42 | 0.713658 | 0.25 | | | | |
| third lens element 5 | object-side surface 51 | -3.95393 | 0.452 | 1.544 | 56.1143 | plastic | 1.681 |
| | image-side surface 52 | -0.77482 | 0.04 | | | | |
| fourth lens element 6 | object-side surface 61 | -15.0258 | 0.281 | 1.544 | 56.1143 | plastic | -4.839 |
| | image-side surface 62 | 3.226763 | 0.3 | | | | |
| Optical filter 7 | object-side surface 71 | ∞ | 0.21 | | | | |
| | image-side surface 72 | ∞ | 1.13001 | | | | |
| Image plane 8 | | ∞ | | | | | |

FIG. 10

| surface | 31 | 32 | 41 | 42 | 51 | 52 | 61 | 62 |
|---|---|---|---|---|---|---|---|---|
| K | 0.00E+00 | 0.00E+00 | 0.00E+00 | 0.00E+00 | 0.00E+00 | 0.00E+00 | 0.00E+00 | 0.00E+00 |
| $a_4$ | -4.70E-02 | 6.80E-01 | -3.89E-01 | -1.26E+00 | 9.43E-02 | 5.47E-01 | 6.56E-02 | -3.10E-01 |
| $a_6$ | 4.33E-01 | -2.13E+00 | 3.84E-01 | 1.59E+00 | -4.06E-01 | -1.03E+00 | -9.70E-01 | 6.95E-02 |
| $a_8$ | -1.36E+00 | 7.58E+00 | -1.58E+00 | -4.43E+00 | 2.80E+00 | 4.26E+00 | 1.35E+00 | 6.70E-02 |
| $a_{10}$ | 3.24E+00 | -1.26E+01 | 4.42E+00 | 7.35E+00 | -8.63E-02 | -9.11E+00 | -5.02E-01 | -1.13E-01 |
| $a_{12}$ | 6.54E-02 | 1.74E+01 | -1.67E+00 | -1.08E+01 | -4.02E+00 | 1.26E+01 | -5.09E-01 | 1.45E-02 |

FIG. 11 system focal length =3.47mm, half field-of-view =34.692°, F-number =2.4, system length =4.73mm

| lens element | surface | radius of curvature | thickness | refractive index | Abbe number | material | focal length |
|---|---|---|---|---|---|---|---|
| object | | ∞ | ∞ | | | | |
| aperture stop 2 | | ∞ | 0 | | | | |
| first lens element 3 | object-side surface 31 | 3.015097 | 0.654 | 1.544 | 56.1143 | plastic | 3.087 |
| | image-side surface 32 | -3.52846 | 0.12 | | | | |
| second lens element 4 | object-side surface 41 | 10.0387 | 0.62 | 1.6398 | 23.2654 | plastic | -4.933 |
| | image-side surface 42 | 2.356311 | 0.76 | | | | |
| third lens element 5 | object-side surface 51 | -11.585 | 0.65 | 1.544 | 56.1143 | plastic | 1.528 |
| | image-side surface 52 | -0.79343 | 0.08 | | | | |
| fourth lens element 6 | object-side surface 61 | -20.0094 | 0.4 | 1.544 | 56.1143 | plastic | -1.588 |
| | image-side surface 62 | 0.912477 | 0.5 | | | | |
| Optical filter 7 | object-side surface 71 | ∞ | 0.3 | | | | |
| | image-side surface 72 | ∞ | 0.649762 | | | | |
| Image plane 8 | | ∞ | | | | | |

FIG. 14

| surface | 31 | 32 | 41 | 42 | 51 | 52 | 61 | 62 |
|---|---|---|---|---|---|---|---|---|
| K | -7.48E+01 | 8.88E+00 | 7.53E+00 | 2.86E+00 | 1.36E+01 | -3.40E+00 | -2.99E+02 | -6.29E+00 |
| $a_4$ | 1.75E-01 | -5.13E-02 | -6.67E-02 | -7.52E-02 | -8.09E-02 | -4.09E-02 | -2.59E-02 | -9.24E-02 |
| $a_6$ | -3.43E-01 | -1.41E-01 | -1.43E-01 | -3.01E-02 | 1.49E-01 | 6.92E-03 | 3.52E-02 | 4.92E-02 |
| $a_8$ | 4.44E-02 | 4.03E-01 | 5.29E-01 | 3.75E-02 | -7.61E-02 | 1.21E-01 | -1.61E-02 | -1.69E-02 |
| $a_{10}$ | 4.10E-01 | -3.60E-01 | -5.00E-01 | 6.62E-04 | 1.84E-02 | -7.93E-02 | 2.84E-03 | 2.84E-03 |
| $a_{12}$ | -3.77E-01 | 9.41E-02 | 1.58E-01 | -1.96E-02 | -3.44E-03 | 1.46E-02 | -1.61E-04 | -2.06E-04 |

FIG. 15

| system focal length =2.30mm, half field-of-view =36.463°, F-number =2.0, system length =3.44mm |||||||
|---|---|---|---|---|---|---|
| lens element | surface | radius of curvature | thickness | refractive index | Abbe number | material | focal length |
| object | | ∞ | ∞ | | | | |
| first lens element 3 | object-side surface 31 | 19.68854 | 0.433985 | 1.544 | 56.1143 | plastic | 3.056 |
| | image-side surface 32 | -1.80866 | 0.049489 | | | | |
| aperture stop 2 | | ∞ | 0 | | | | |
| second lens element 4 | object-side surface 41 | 1.398226 | 0.289628 | 1.639 | 23.5288 | plastic | -3.711 |
| | image-side surface 42 | 0.810757 | 0.287344 | | | | |
| third lens element 5 | object-side surface 51 | -13.4272 | 0.424774 | 1.544 | 56.1143 | plastic | 1.691 |
| | image-side surface 52 | -0.87351 | 0.047722 | | | | |
| fourth lens element 6 | object-side surface 61 | -34.1846 | 0.42671 | 1.639 | 23.5288 | plastic | -4.668 |
| | image-side surface 62 | 3.315243 | 0.3 | | | | |
| Optical filter 7 | object-side surface 71 | ∞ | 0.21 | | | | |
| | image-side surface 72 | ∞ | 0.965814 | | | | |
| Image plane 8 | | ∞ | | | | | |

FIG. 18

| surface | 31 | 32 | 41 | 42 | 51 | 52 | 61 | 62 |
|---|---|---|---|---|---|---|---|---|
| K | 0.00E+00 | 0.00E+00 | 0.00E+00 | 0.00E+00 | 0.00E+00 | 0.00E+00 | 0.00E+00 | 0.00E+00 |
| $a_4$ | -1.25E-02 | 1.28E-01 | -4.70E-01 | -9.78E-01 | -8.18E-02 | 4.47E-01 | 2.24E-01 | -4.95E-02 |
| $a_6$ | -3.37E-01 | -4.17E-01 | 9.52E-02 | 6.12E-01 | 1.87E-01 | -8.53E-01 | -1.06E+00 | -2.52E-01 |
| $a_8$ | 5.66E-01 | 1.37E+00 | 5.11E-01 | -1.35E+00 | -1.41E+00 | 2.47E+00 | 1.97E+00 | 4.67E-01 |
| $a_{10}$ | -2.21E-01 | -1.77E+00 | -3.95E-01 | 1.29E+00 | 4.83E+00 | -4.44E+00 | -1.82E+00 | -3.82E-01 |
| $a_{12}$ | -9.49E-02 | 7.05E-01 | -1.82E+00 | -3.48E+00 | -4.73E+00 | 5.61E+00 | 7.06E-01 | 1.19E-01 |

FIG. 19 system focal length =2.71mm , half field-of-view =32.062° , F-number =2.0 , system length =3.96mm

| lens element | surface | radius of curvature | thickness | refractive index | Abbe number | material | focal length |
|---|---|---|---|---|---|---|---|
| object | | ∞ | ∞ | | | | |
| first lens element 3 | object-side surface 31 | 4.581532 | 0.414152 | 1.544 | 56.1143 | plastic | 3.379 |
| | image-side surface 32 | -2.98887 | 0.279774 | | | | |
| aperture stop 2 | | ∞ | 0 | | | | |
| second lens element 4 | object-side surface 41 | 1.290684 | 0.182653 | 1.639 | 23.5288 | plastic | -4.024 |
| | image-side surface 42 | 0.81406 | 0.291717 | | | | |
| third lens element 5 | object-side surface 51 | -8.88605 | 0.52821 | 1.544 | 56.1143 | plastic | 2.036 |
| | image-side surface 52 | -1.00856 | 0.079115 | | | | |
| fourth lens element 6 | object-side surface 61 | -30.7262 | 0.644962 | 1.639 | 23.5288 | plastic | -5.918 |
| | image-side surface 62 | 4.391383 | 0.3 | | | | |
| Optical filter 7 | object-side surface 71 | ∞ | 0.21 | | | | |
| | image-side surface 72 | ∞ | 1.02874 | | | | |
| Image plane 8 | | ∞ | | | | | |

FIG. 22

| surface | 31 | 32 | 41 | 42 | 51 | 52 | 61 | 62 |
|---|---|---|---|---|---|---|---|---|
| K | 0.00E+00 | 0.00E+00 | 0.00E+00 | 0.00E+00 | 0.00E+00 | 0.00E+00 | 0.00E+00 | 0.00E+00 |
| $a_4$ | -4.81E-03 | 1.06E-01 | -5.57E-01 | -9.41E-01 | -2.73E-02 | 3.53E-01 | 1.88E-01 | -3.35E-02 |
| $a_6$ | -2.60E-01 | -5.46E-01 | 1.81E-01 | 5.77E-01 | 1.26E-01 | -8.19E-01 | -7.65E-01 | -1.51E-01 |
| $a_8$ | 5.10E-01 | 1.46E+00 | 3.92E-01 | -1.39E+00 | -1.32E+00 | 2.01E+00 | 1.10E+00 | 2.00E-01 |
| $a_{10}$ | -4.28E-01 | -1.67E+00 | -2.11E-01 | 1.84E+00 | 3.20E+00 | -3.15E+00 | -6.93E-01 | -1.16E-01 |
| $a_{12}$ | 1.60E-01 | 7.65E-01 | -1.17E+00 | -3.07E+00 | -2.16E+00 | 2.86E+00 | 1.79E-01 | 2.66E-02 |

FIG. 23 system focal length =2.74mm, half field-of-view =31.782°, F-number =2.0, system length =3.87mm

| lens element | surface | radius of curvature | thickness | refractive index | Abbe number | material | focal length |
|---|---|---|---|---|---|---|---|
| object | | ∞ | ∞ | | | | |
| first lens element 3 | object-side surface 31 | 4.39438 | 0.390895 | 1.544 | 56.1143 | plastic | 3.268 |
| | image-side surface 32 | -2.90989 | 0.195723 | | | | |
| aperture stop 2 | | ∞ | 0 | | | | |
| second lens element 4 | object-side surface 41 | 1.307647 | 0.180145 | 1.639 | 23.5288 | plastic | -4.007 |
| | image-side surface 42 | 0.82126 | 0.400507 | | | | |
| third lens element 5 | object-side surface 51 | -5.79825 | 0.416106 | 1.544 | 56.1143 | plastic | 2.13 |
| | image-side surface 52 | -0.99318 | 0.085164 | | | | |
| fourth lens element 6 | object-side surface 61 | -38.9802 | 0.431342 | 1.639 | 23.5288 | plastic | -6.748 |
| | image-side surface 62 | 4.91762 | 0.3 | | | | |
| Optical filter 7 | object-side surface 71 | ∞ | 0.21 | | | | |
| | image-side surface 72 | ∞ | 1.254696 | | | | |
| Image plane 8 | | ∞ | | | | | |

FIG. 26

| surface | 31 | 32 | 41 | 42 | 51 | 52 | 61 | 62 |
|---|---|---|---|---|---|---|---|---|
| K | 0.00E+00 | 0.00E+00 | 0.00E+00 | 0.00E+00 | 0.00E+00 | 0.00E+00 | 0.00E+00 | 0.00E+00 |
| $a_4$ | -4.82E-03 | 1.24E-01 | -5.70E-01 | -9.52E-01 | 2.35E-02 | 3.77E-01 | 1.78E-01 | -3.50E-02 |
| $a_6$ | -2.43E-01 | -5.46E-01 | 1.83E-01 | 5.93E-01 | 3.25E-02 | -8.22E-01 | -6.93E-01 | -1.62E-01 |
| $a_8$ | 4.84E-01 | 1.48E+00 | 3.70E-01 | -1.37E+00 | -1.16E+00 | 1.88E+00 | 7.78E-01 | 1.79E-01 |
| $a_{10}$ | -3.99E-01 | -1.75E+00 | -2.36E-01 | 1.77E+00 | 2.79E+00 | -2.98E+00 | -3.36E-01 | -8.93E-02 |
| $a_{12}$ | 1.55E-01 | 8.39E-01 | -1.20E+00 | -3.00E+00 | -1.79E+00 | 2.78E+00 | 5.83E-02 | 2.09E-02 |

FIG. 27

| relationship | first preferred embodiment | second preferred embodiment | third preferred embodiment | fourth preferred embodiment | fifth preferred embodiment | sixth preferred embodiment | seventh preferred embodiment |
|---|---|---|---|---|---|---|---|
| AAG | 0.34 | 0.34 | 0.34 | 0.96 | 0.39 | 0.65 | 0.68 |
| ALT | 1.22 | 1.22 | 1.22 | 2.32 | 1.58 | 1.77 | 1.42 |
| EFL | 2.80 | 2.40 | 2.30 | 3.47 | 2.30 | 2.71 | 2.74 |
| EFL/CT1 | 9.69 | 8.30 | 7.96 | 5.30 | 5.30 | 6.55 | 7.01 |
| CT3/AC34 | 11.30 | 11.30 | 11.30 | 8.13 | 8.90 | 6.68 | 4.89 |
| AAG/AC34 | 8.50 | 8.50 | 8.50 | 12.00 | 8.06 | 8.22 | 8.00 |
| CT1/CT2 | 1.46 | 1.46 | 1.46 | 1.05 | 1.50 | 2.26 | 2.17 |
| ALT/CT1 | 4.22 | 4.22 | 4.22 | 3.55 | 3.63 | 4.28 | 3.63 |
| CT3/CT1 | 1.56 | 1.56 | 1.56 | 0.99 | 0.98 | 1.28 | 1.06 |
| CT3/CT4 | 1.61 | 1.61 | 1.61 | 1.63 | 1.00 | 0.82 | 0.96 |
| ALT/CT3 | 2.70 | 2.70 | 2.70 | 3.58 | 3.71 | 3.35 | 3.41 |

FIG. 29

IMAGING LENS AND PORTABLE ELECTRONIC APPARATUS HAVING THE SAME

CROSS-REFERENCE TO RELATED APPLICATION

This application claims priority to Chinese Application No. 201210583409.1, filed on Dec. 28, 2012.

BACKGROUND OF THE INVENTION

1. Field of the Invention

The present invention relates to an imaging lens and a portable electronic apparatus having the same.

2. Description of the Related Art

In recent years, as use of portable electronic devices (e.g., mobile phones and digital cameras) becomes ubiquitous, much effort has been put into reducing dimensions of portable electronic devices. Moreover, as dimensions of charged coupled device (CCD) and complementary metal-oxide semiconductor (CMOS) based optical sensors are reduced, dimensions of imaging lenses for use with the optical sensors must be correspondingly reduced without significantly compromising optical performance.

Taiwanese patent nos. M354075, M360372, and I324262 respectively disclose a conventional imaging lens with four lens elements. In the case of a first preferred embodiment of Taiwanese patent no. I324262, a distance between an object-side surface of a first lens element and an imaging plane thereof at an optical axis is 5.615 mm.

Taiwanese application publication no. 200842429 discloses a conventional imaging lens with four lens elements. A distance between an object-side surface of a first lens element and an imaging plane thereof at an optical axis is 10.869 mm.

U.S. Pat. No. 8,102,608 discloses a conventional imaging lens with four lens elements. A distance between an object-side surface of a first lens element and an imaging plane thereof at an optical axis is 7.22 mm.

The aforementioned conventional imaging lenses go against the trend toward reducing dimensions of mobile phones due to their longer system lengths.

SUMMARY OF THE INVENTION

Therefore, an object of the present invention is to provide an imaging lens having a shorter overall length while maintaining good optical performance.

According to one aspect of the present invention, an imaging lens comprises first, second, third, and fourth lens elements arranged from an object side to an image side in the given order. Each of the first, second, third, and fourth lens elements has an object-side surface facing toward the object side and an image-side surface facing toward the image side.

The first lens element has a positive refractive power. The object-side surface of the first lens element has a convex portion in a vicinity of an optical axis of the imaging lens. The image-side surface of the first lens element has a convex portion in a vicinity of the optical axis.

The object-side surface of the second lens element has a convex portion in a vicinity of the optical axis, and the image-side surface of the second lens element has a concave portion in a vicinity of the optical axis.

The fourth lens element has a negative refractive power, and the object-side surface thereof has a concave portion in a vicinity of the optical axis.

The imaging lens satisfies $EFL/CT1 \geq 5.30$, where EFL represents an effective focal length of the imaging lens, and $CT1$ represents a distance between the object-side surface and the image-side surface of the first lens element at the optical axis.

The imaging lens does not include any lens element with refractive power other than the first, second, third, and fourth lens elements.

Another object of the present invention is to provide a portable electronic apparatus having an imaging lens with four lens elements.

According to another aspect of the present invention, an electronic apparatus includes a housing and an imaging module. The imaging module is disposed in the housing, and includes the imaging lens of the present invention, a barrel on which the imaging lens is disposed, a seat unit on which the barrel is disposed, and an image sensor disposed at the image side and operatively associated with the imaging lens for capturing images.

BRIEF DESCRIPTION OF THE DRAWINGS

Other features and advantages of the present invention will become apparent in the following detailed description of the preferred embodiments with reference to the accompanying drawings, of which:

FIG. 2 shows values of some optical parameters corresponding to the imaging lens of the first preferred embodiment;

FIG. 3 shows values of some parameters of an optical relationship corresponding to the imaging lens of the first preferred embodiment;

FIG. 6 shows values of some optical parameters corresponding to the imaging lens of the second preferred embodiment;

FIG. 7 shows values of some parameters of an optical relationship corresponding to the imaging lens of the second preferred embodiment;

FIG. 10 shows values of some optical parameters corresponding to the imaging lens of the third preferred embodiment;

FIG. 11 shows values of some parameters of an optical relationship corresponding to the imaging lens of the third preferred embodiment;

FIG. 14 shows values of some optical parameters corresponding to the imaging lens of the fourth preferred embodiment;

FIG. 15 shows values of some parameters of an optical relationship corresponding to the imaging lens of the fourth preferred embodiment;

FIG. 18 shows values of some optical parameters corresponding to the imaging lens of the fifth preferred embodiment;

FIG. 19 shows values of some parameters of an optical relationship corresponding to the imaging lens of the fifth preferred embodiment;

FIG. 22 shows values of some optical parameters corresponding to the imaging lens of the sixth preferred embodiment;

FIG. 23 shows values of some parameters of an optical relationship corresponding to the imaging lens of the sixth preferred embodiment;

FIG. 26 shows values of some optical parameters corresponding to the imaging lens of the seventh preferred embodiment;

FIG. 27 shows values of some parameters of an optical relationship corresponding to the imaging lens of the seventh preferred embodiment;

FIG. 29 is a table that lists values of parameters of other optical relationships corresponding to the imaging lenses of the first to seventh preferred embodiments;

DETAILED DESCRIPTION OF THE PREFERRED EMBODIMENTS

Figure 1:
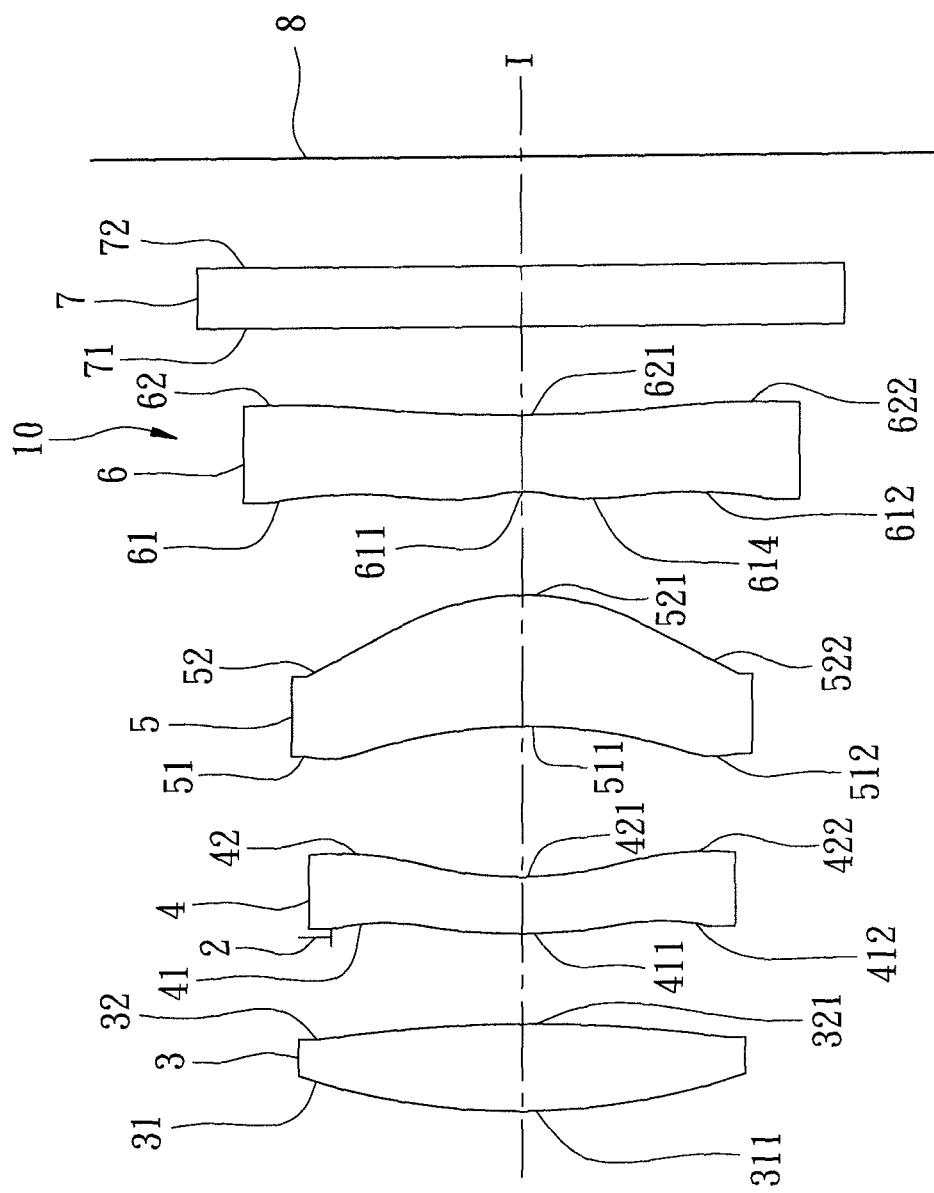
FIG. 1 is a schematic diagram that illustrates the first preferred embodiment of an imaging lens according to the present invention.

Before the present invention is described in greater detail, it should be noted that like elements are denoted by the same reference numerals throughout the disclosure.

Referring to FIG. 1, the first preferred embodiment of an imaging lens 10 according to the present invention includes a first lens element 3, an aperture stop 2, second, third, and fourth lens elements 4-6, and an optical filter 7 arranged in the given order along an optical axis (I) from an object side to an image side. The optical filter 7 is an infrared cut filter for selectively absorbing infrared light to thereby reduce imperfection of images formed at an image plane 8.

Each of the first, second, third, and fourth lens elements 3-6 and the optical filter 7 has an object-side surface 31, 41, 51, 61, 71 facing toward the object side, and an image-side surface 32, 42, 52, 62, 72 facing toward the image side. Light entering the imaging lens 10 travels through the object-side and image-side surfaces 31, 32 of the first lens element 3, the aperture stop 2, the object-side and image-side surfaces 41, 42 of the second lens element 4, the object-side and image-side surfaces 51, 52 of the third lens element 5, the object-side and image-side surfaces 61, 62 of the fourth lens element 6, and the object-side and image-side surfaces 71, 72 of the optical filter 7, in the given order, to form an image on the image plane 8. Each of the object-side surfaces 31, 41, 51, 61 and the image-side surfaces 32, 42, 52, 62 is aspherical and has a center point coinciding with the optical axis (I).

During manufacture, the first lens element 3 may be formed with a peripheral extending portion, which may be flat or stepped in shape. In terms of function, while the object-side and image-side surfaces 31, 32 are configured to enable passage of light through the first lens element 3, the extending portion merely serves to provide the function of installation and does not contribute toward passage of light through the first lens element 3. The other lens elements 4-6 may also be formed with extending portions similar to that of the first lens element 3.

The lens elements 3-6 are made of plastic material in this embodiment, and at least one of them may be made of other materials in other embodiments.

In the first preferred embodiment, which is depicted in FIG. 1, the first lens element 3 has a positive refractive power. The object-side surface 31 of the first lens element 3 is a convex surface that has a convex portion 311 in a vicinity of the optical axis (I). The image-side surface 32 of the first lens element 3 is a convex surface that has a convex portion 321 in a vicinity of the optical axis (I).

The second lens element 4 has a negative refractive power. The object-side surface 41 of the second lens element 4 has a convex portion 411 in a vicinity of the optical axis (I) and a concave portion 412 in a vicinity of a periphery of the second lens element 4. The image-side surface 42 of the second lens element 4 has a concave portion 421 in a vicinity of the optical axis (I) and a convex portion 422 in a vicinity of the periphery of the second lens element 4.

The third lens element 5 has a positive refractive power. The object-side surface 51 of the third lens element 5 has a concave portion 511 in a vicinity of the optical axis (I) and a convex portion 512 in a vicinity of a periphery of the third lens element 5. The image-side surface 52 of the third lens element 5 has a convex portion 521 in a vicinity of the optical axis (I) and a concave portion 522 in a vicinity of the periphery of the third lens element 5.

The fourth lens element 6 has a negative refractive power. The object-side surface 61 of the fourth lens element 6 has a concave portion 611 in a vicinity of the optical axis (I), a concave portion 612 in a vicinity of a periphery of the fourth lens element 6, and a convex portion 614 between the concave portions 611, 612. The image-side surface 62 of the fourth lens element 6 has a concave portion 621 in a vicinity of the optical axis (I) and a convex portion 622 in a vicinity of the periphery of the fourth lens element 6.

Shown in FIG. 2 is a table that lists values of some optical parameters corresponding to the surfaces 31-61, 32-62 of the first preferred embodiment. The imaging lens 10 has an overall system effective focal length (EFL) of 2.80 mm, a half field-of-view (HFOV) of 31.255, an F-number of 2.0, and a system length of 3.75 mm. The system length refers to a distance between the object-side surface 31 of the first lens element 3 and the image plane 8.

In this embodiment, each of the object-side surfaces 31-61 and the image-side surfaces 32-62 is aspherical, and satisfies the optical relationship of $$Z(Y) = \frac{Y^2}{R} \bigg/ \left(1 + \sqrt{1-(1+K)\frac{Y^2}{R^2}}\right) + \sum_{i=1}^{n} a_{2i} \times Y^{2i} \quad (1)$$

where:

R represents a radius of curvature of the aspherical surface;

Z represents a depth of an aspherical surface, which is defined as a perpendicular distance between an arbitrary point on the aspherical surface that is spaced apart from the optical axis (I) by a distance Y, and a tangent plane at a vertex of the aspherical surface at the optical axis (I);

Y represents a perpendicular distance between the arbitrary point on the aspherical surface and the optical axis (I);

K represents a conic constant; and $a_{2i}$ represents a $2i^{th}$ aspherical coefficient.

Shown in FIG. 3 is a table that lists values of some optical parameters of the aforementioned optical relationship (1) corresponding to the first preferred embodiment.

Relationships among some of the aforementioned optical parameters corresponding to the first preferred embodiment are as follows:

EFL/CT1=9.69

CT3/AC34=11.30

AAG/AC34=8.50

CT1/CT2=1.46

ALT/CT1=4.22

CT3/CT1=1.56

CT3/CT4=1.61

ALT/CT3=2.70 where:

CT1 represents a distance between the object-side surface 31 and the image-side surface 32 of the first lens element 3 at the optical axis (I);

CT2 represents a distance between the object-side surface 41 and the image-side surface 42 of the second lens element 4 at the optical axis (I);

CT3 represents a distance between the object-side surface 51 and the image-side surface 52 of the third lens element 5 at the optical axis (I);

CT4 represents a distance between the object-side surface 61 and the image-side surface 62 of the fourth lens element 6 at the optical axis (I);

AAG represents a sum of a distance between the image-side surface 32 of the first lens element 3 and the object-side surface 41 of the second lens element 4 at the optical axis (I), a distance between the image-side surface 42 of the second lens element 4 and the object-side surface 51 of the third lens element 5 at the optical axis (I), and a distance between the image-side surface 52 of the third lens element 5 and the object-side surface 61 of the fourth lens element 6 at the optical axis (I);

EFL (effective focal length) represents a system focal length of the imaging lens 10;

AC12 represents the distance between the image-side surface 32 of the first lens element 3 and the object-side surface 41 of the second lens element 4 at the optical axis (I);

AC34 represents the distance between the image-side surface 52 of the third lens element 5 and the object-side surface 61 of the fourth lens element 6 at the optical axis (I); and ALT represents a sum of the distance between the object-side surface 31 and the image-side surface 32 of the first lens element 3 at the optical axis (I), the distance between the object-side surface 41 and the image-side surface 42 of the second lens element 4 at the optical axis (I), the distance between the object-side surface 51 and the image-side surface 52 of the third lens element 5 at the optical axis (I), and the distance between the object-side surface 61 and the image-side surface 62 of the fourth lens element 6 at the optical axis (I).

FIGS. 4(a) to 4(d) show simulation results corresponding to longitudinal spherical aberration, sagittal astigmatism aberration, tangential astigmatism aberration, and distortion aberration of the first preferred embodiment, respectively. In each of the simulation results, curves corresponding respectively to wavelengths of 470 nm, 555 nm, and 650 nm are shown.

Figure 4:
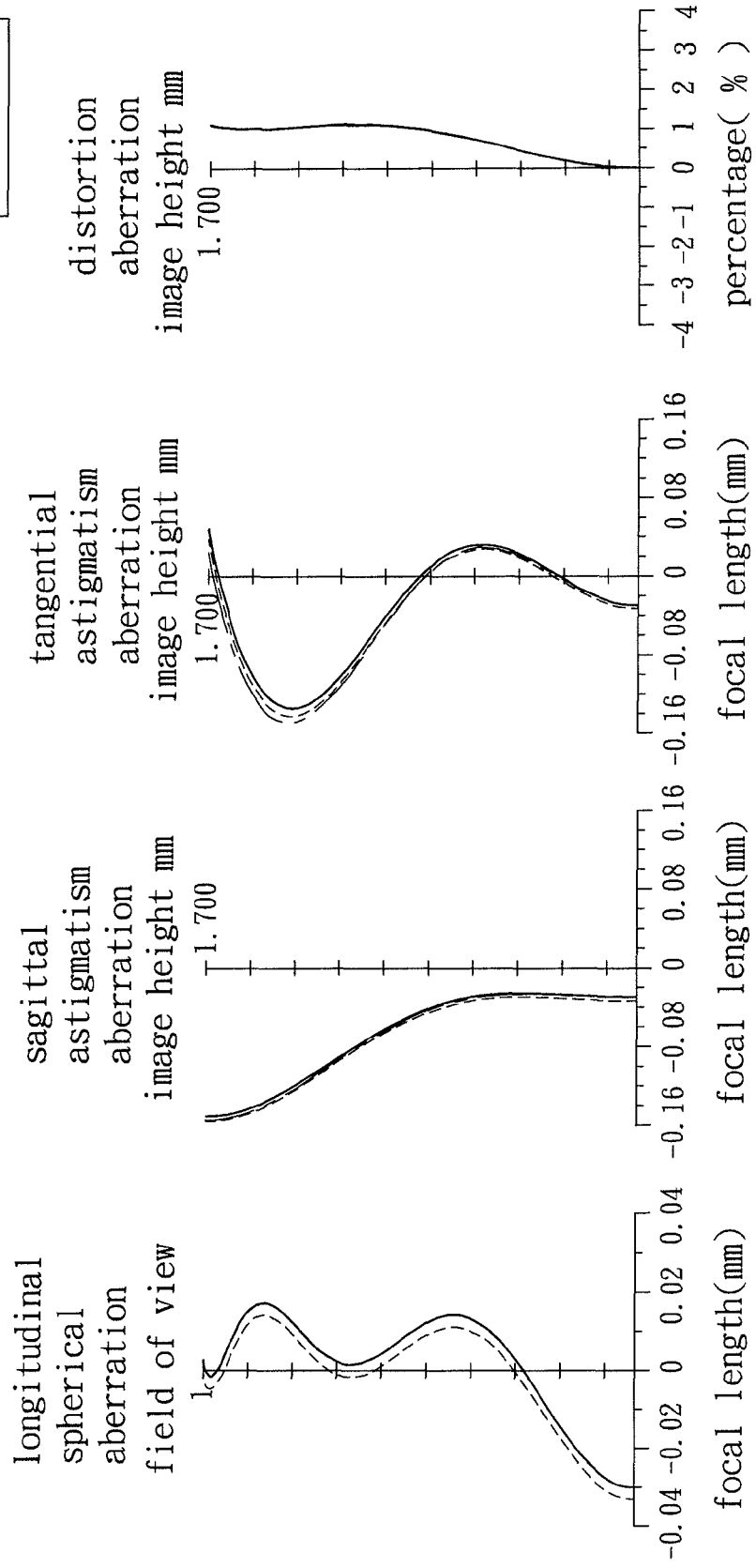
FIGS. 4(a) to 4(d) show different optical characteristics of the imaging lens of the first preferred embodiment.

It can be understood from FIG. 4(a) that, since each of the curves corresponding to longitudinal spherical aberration has a focal length at each field of view (indicated by the vertical axis) that falls within the range of ±0.04 mm, the first preferred embodiment is able to achieve a relatively low spherical aberration at each of the wavelengths. Furthermore, since a deviation in focal length among the curves at each field of view does not exceed the range of ±0.005 mm, the first preferred embodiment has a relatively low chromatic aberration.

It can be understood from FIGS. 4(b) and 4(c) that, since each of the curves falls within the range of ±0.16 mm of focal length, the first preferred embodiment has a relatively low optical aberration.

Moreover, as shown in FIG. 4(d), since each of the curves corresponding to distortion aberration falls within the range of ±1.5%, the first preferred embodiment is able to meet requirements in imaging quality of most optical systems.

In view of the above, even with the system length reduced down to 3.75 mm, the imaging lens 10 of the first preferred embodiment is still able to achieve a relatively good optical performance.

Figure 5:
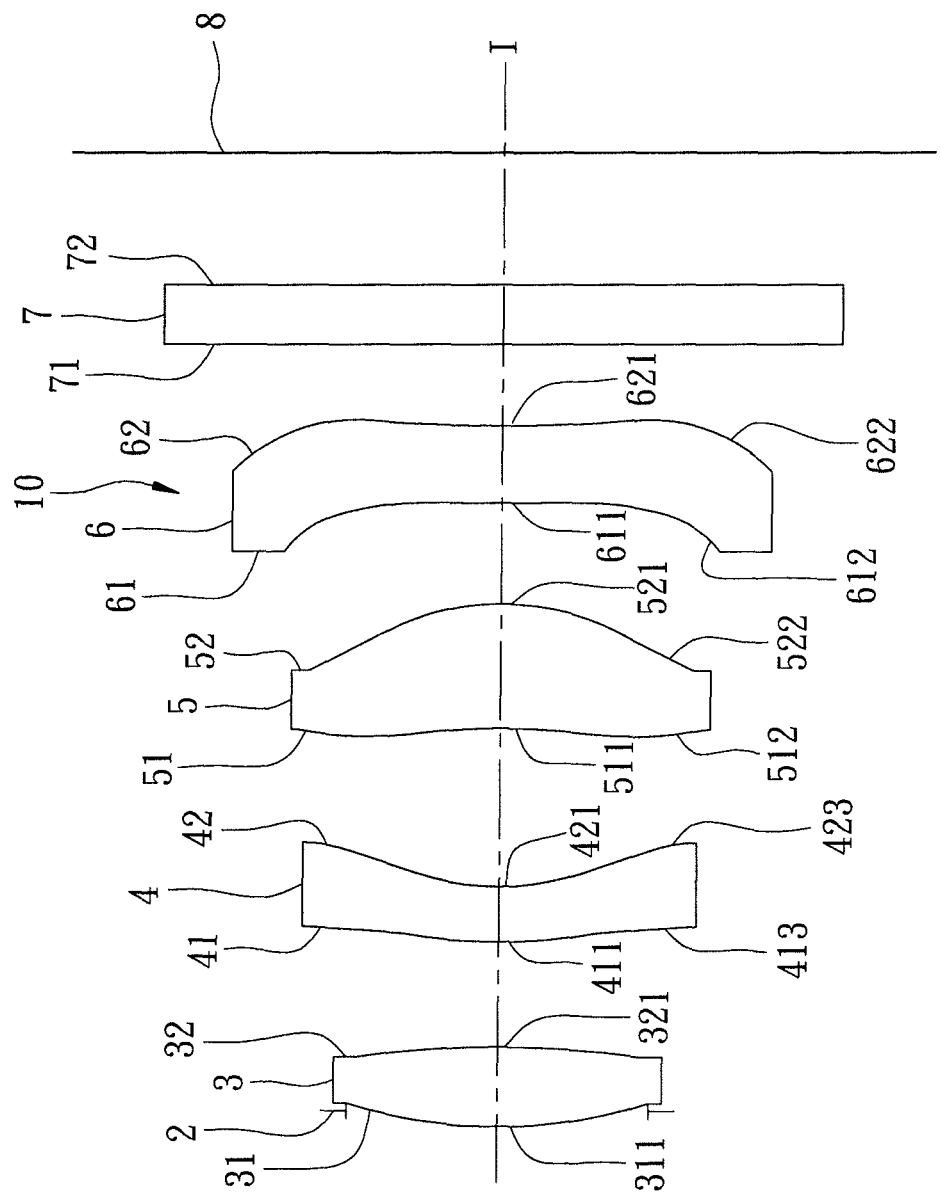
FIG. 5 is a schematic diagram that illustrates the second preferred embodiment of an imaging lens according to the present invention.
Figure 8:
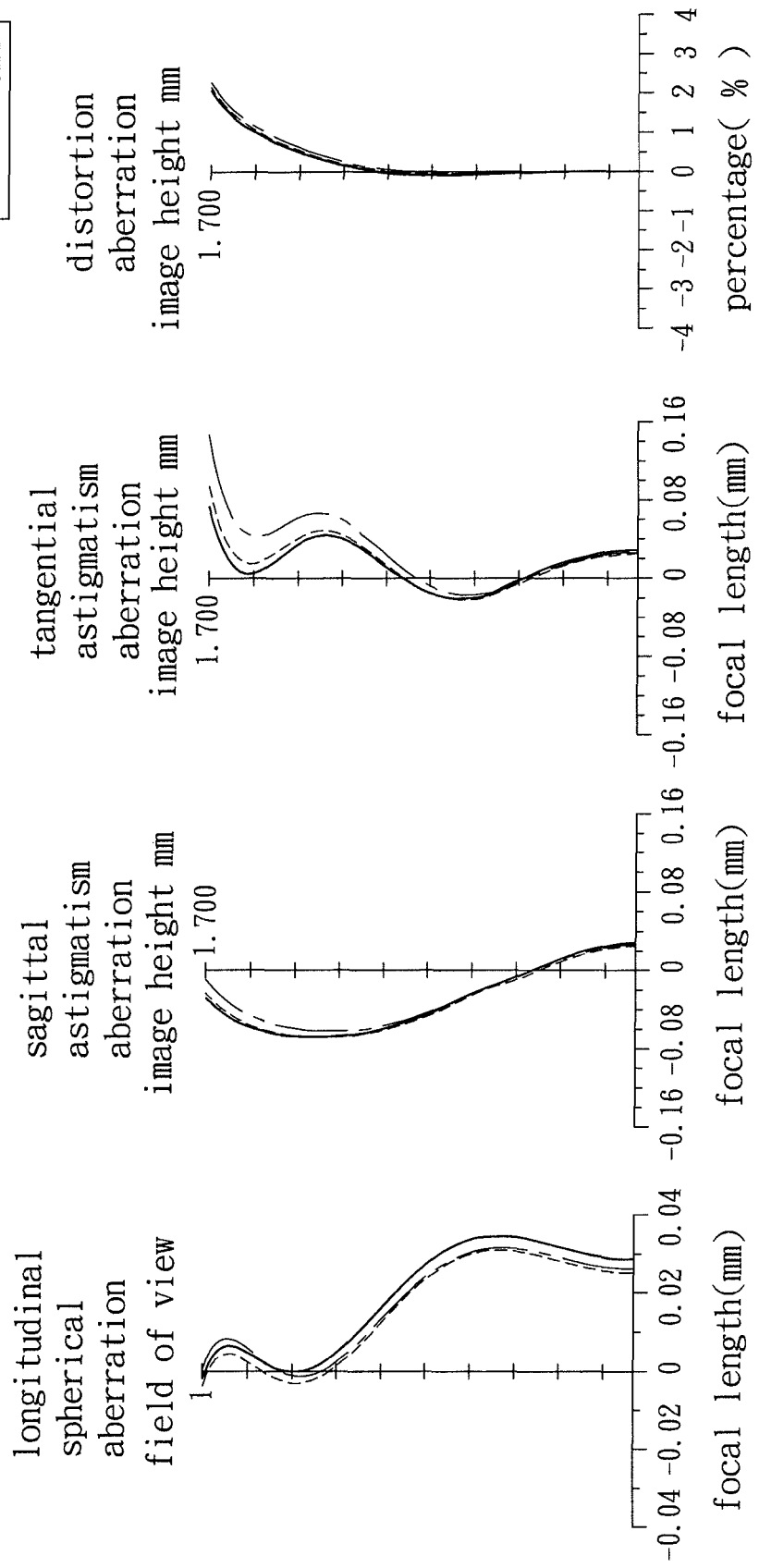
FIGS. 8(a) to 8(d) show different optical characteristics of the imaging lens of the second preferred embodiment.

Referring to FIG. 5, the difference between the first and second preferred embodiments resides in that:

The aperture stop 2 is disposed at the object side of the first lens element 3. The object-side surface 41 of the second lens element 4 is a convex surface that has a convex portion 413 in a vicinity of the periphery of the second lens element 4. The image-side surface 42 of the second lens element 4 is a concave surface that has a concave portion 423 in a vicinity of the periphery of the second lens element 4. The object-side surface 61 of the fourth lens element 6 is a concave surface that only has a concave portion 611 in a vicinity of the optical axis (I) and a concave portion 612 in a vicinity of the periphery of the fourth lens element 6.

Shown in FIG. 6 is a table that lists values of some optical parameters corresponding to the surfaces 31-61, 32-62 of the second preferred embodiment. The imaging lens 10 has an overall system focal length of 2.40 mm, an HFOV of 35.304°, an F-number of 2.2, and a system length of 3.18 mm.

Shown in FIG. 7 is a table that lists values of some optical parameters of the aforementioned optical relationship (1) corresponding to the second preferred embodiment.

Relationships among some of the aforementioned optical parameters corresponding to the second preferred embodiment are as follows:

EFL/CT1=8.30

CT3/AC34=11.30

AAG/AC34=8.50

$CT1/CT2=1.46$ $ALT/CT1=4.22$ $CT3/CT1=1.56$ $CT3/CT4=1.61$ $ALT/CT3=2.70$

FIGS. 8(a) to 8(d) show simulation results corresponding to longitudinal spherical aberration, sagittal astigmatism aberration, tangential astigmatism aberration, and distortion aberration of the second preferred embodiment, respectively. It can be understood from FIGS. 8(a), 8(b), 8(c) and 8(d) that the second preferred embodiment is able to achieve a relatively good optical performance even with the system length reduced down to 3.18 mm.

Figure 9:
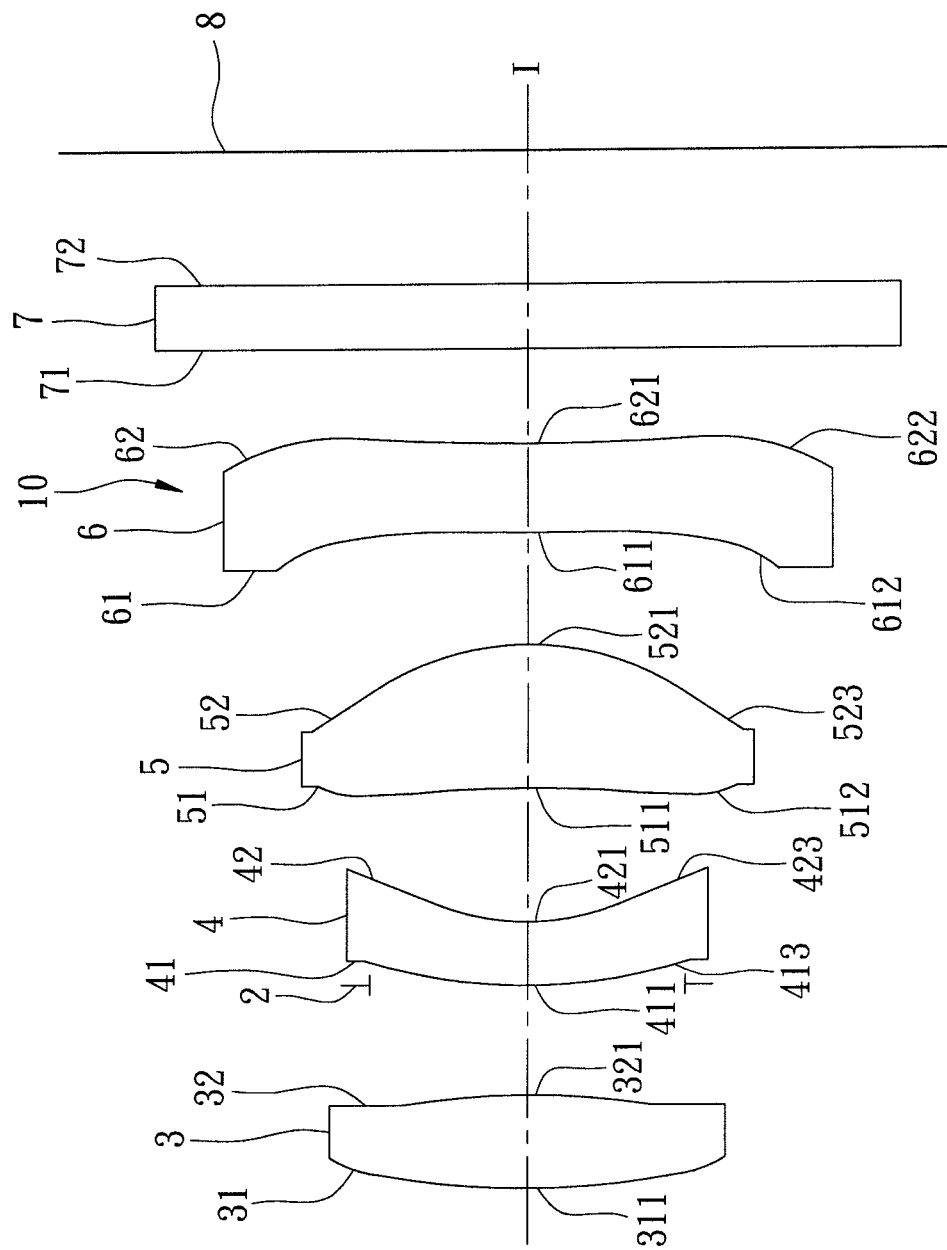
FIG. 9 is a schematic diagram that illustrates the third preferred embodiment of an imaging lens according to the present invention.
Figure 12:
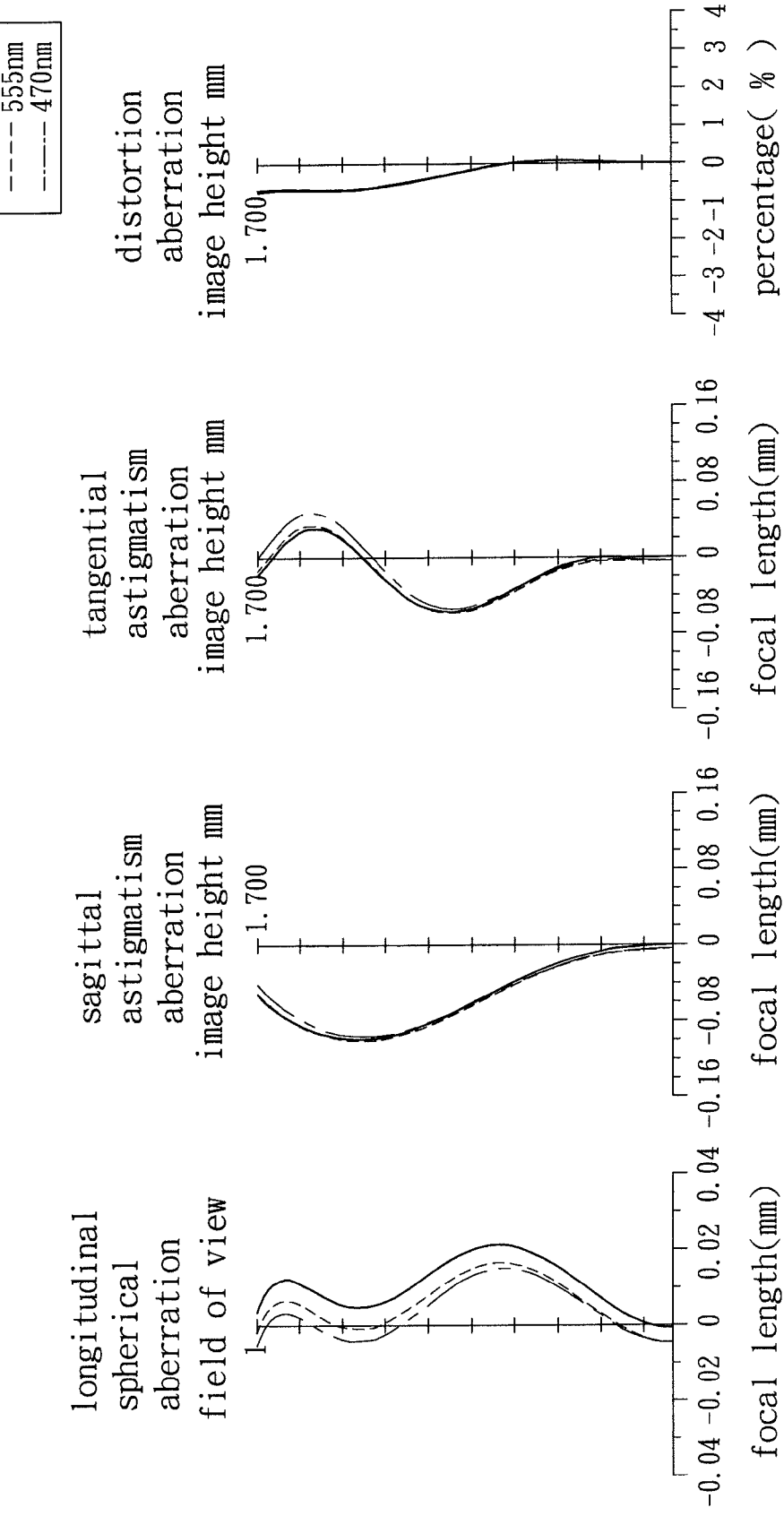
FIGS. 12(a) to 12(d) show different optical characteristics of the imaging lens of the third preferred embodiment.

Referring to FIG. 9, the difference between the first and third preferred embodiments resides in that:

The object-side surface 41 of the second lens element 4 is a convex surface that has a convex portion 413 in a vicinity of the periphery of the second lens element 4. The image-side surface 42 of the second lens element 4 is a concave surface that has a concave portion 423 in a vicinity of the periphery of the second lens element 4. The image-side surface 52 of the third lens element 5 is a convex surface that has a convex portion 523 in a vicinity of the periphery of the third lens element 5. The object-side surface 61 of the fourth lens element 6 is a concave surface that only has a concave portion 611 in a vicinity of the optical axis (I) and a concave portion 612 in a vicinity of the periphery of the fourth lens element 6.

Shown in FIG. 10 is a table that lists values of some optical parameters corresponding to the surfaces 31-61, 32-62 of the third preferred embodiment. The imaging lens 10 has an overall system focal length of 2.30 mm, an HFOV of 36.417°, an F-number of 2.2, and a system length of 3.20 mm.

Shown in FIG. 11 is a table that lists values of some optical parameters of the aforementioned optical relationship (1) corresponding to the third preferred embodiment.

Relationships among some of the aforementioned optical parameters corresponding to the third preferred embodiment are as follows:

$EFL/CT1=7.96$ $CT3/AC34=11.30$ $AAG/AC34=8.50$ $CT1/CT2=1.46$ $ALT/CT1=4.22$ $CT3/CT1=1.56$ $CT3/CT4=1.61$ $ALT/CT3=2.70$

FIGS. 12(a) to 12(d) show simulation results corresponding to longitudinal spherical aberration, sagittal astigmatism aberration, tangential astigmatism aberration, and distortion aberration of the third preferred embodiment, respectively. It can be understood from FIGS. 12(a), 12(b), 12(c) and 12(d) that the third preferred embodiment is likewise able to achieve a relatively good optical performance even with the system length reduced down to 3.20 mm.

Figure 13:
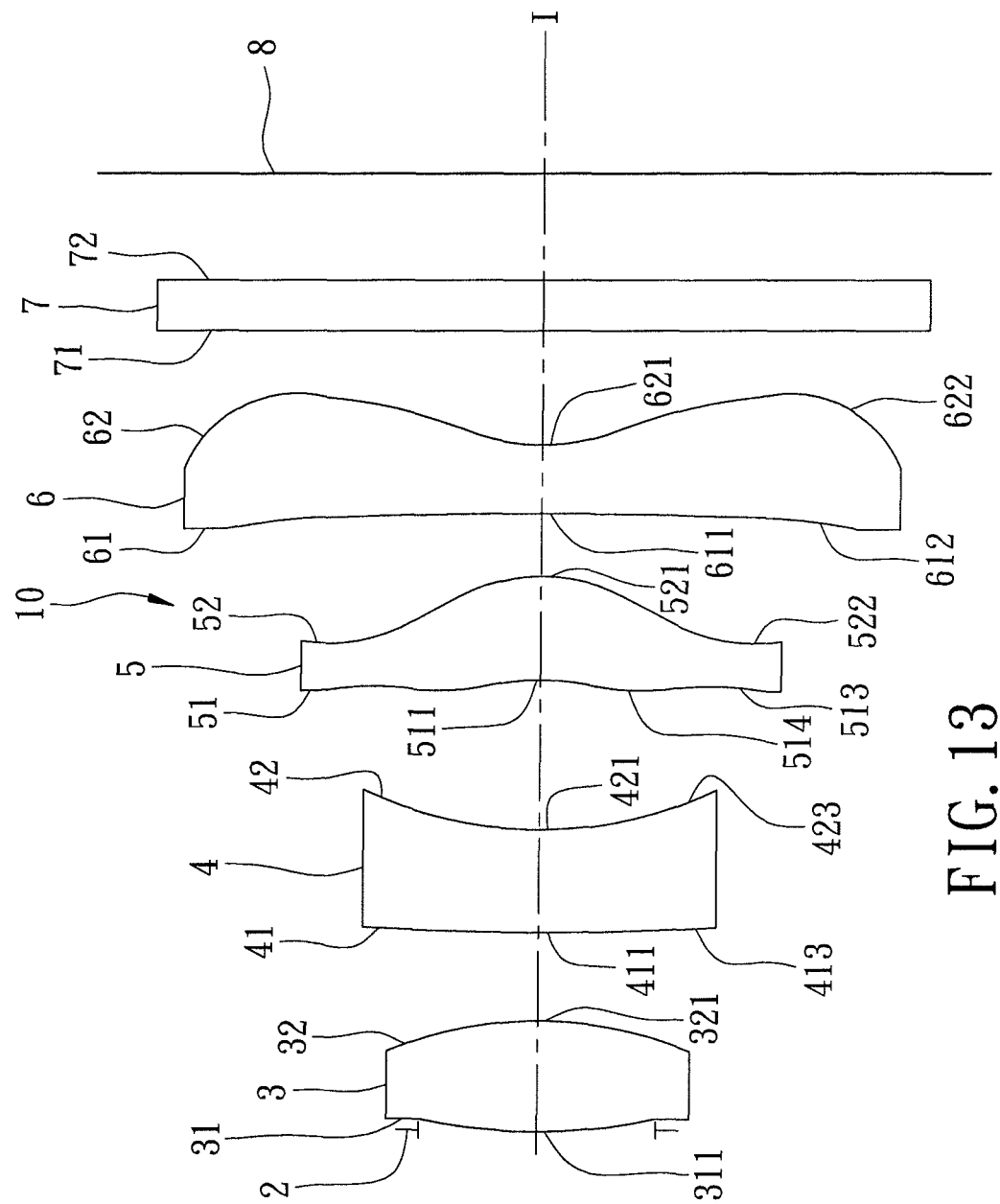
FIG. 13 is a schematic diagram that illustrates the fourth preferred embodiment of an imaging lens according to the present invention.
Figure 16:
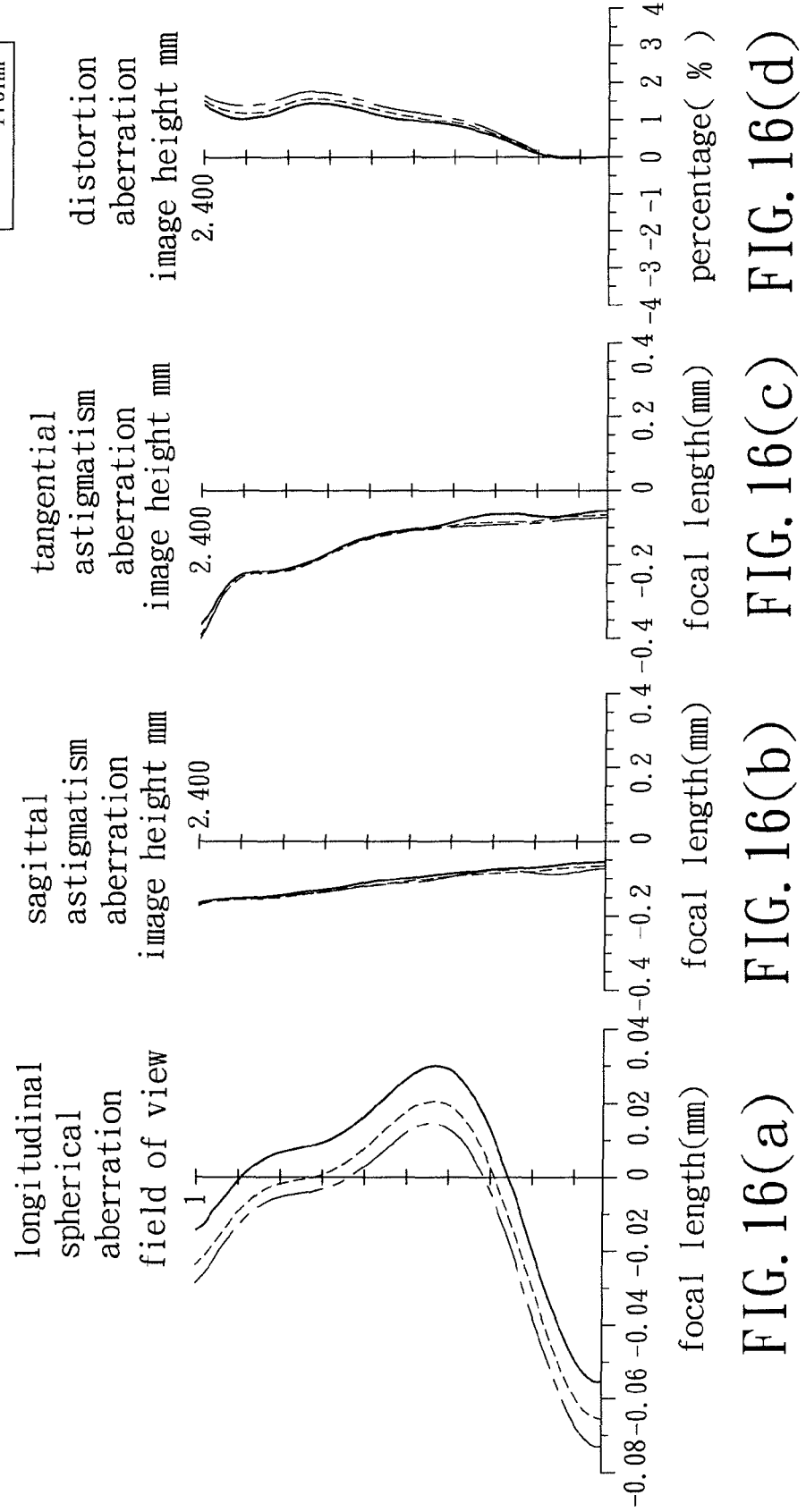
FIGS. 16(a) to 16(d) show different optical characteristics of the imaging lens of the fourth preferred embodiment.

Referring to FIG. 13, the difference between the first and fourth preferred embodiments resides in that:

The aperture stop 2 is disposed at the object side of the first lens element 3. The object-side surface 41 of the second lens element 4 is a convex surface that has a convex portion 413 in a vicinity of the periphery of the second lens element 4. The image-side surface 42 of the second lens element 4 is a concave surface that has a concave portion 423 in a vicinity of the periphery of the second lens element 4. The object-side surface 51 of the third lens element 5 has a concave portion 513 in a vicinity of the periphery of the third lens element 5 and a convex portion 514 between a vicinity of the periphery of the third lens element 5 and a vicinity of the optical axis (I). The object-side surface 61 of the fourth lens element 6 is a concave surface that only has a concave portion 611 in a vicinity of the optical axis (I) and a concave portion 612 in a vicinity of the periphery of the fourth lens element 6.

Shown in FIG. 14 is a table that lists values of some optical parameters corresponding to the surfaces 31-61, 32-62 of the fourth preferred embodiment. The imaging lens 10 has an overall system focal length of 3.47 mm, an HFOV of 34.692°, an F-number of 2.4, and a system length of 4.73 mm.

Shown in FIG. 15 is a table that lists values of some optical parameters of the aforementioned optical relationship (1) corresponding to the fourth preferred embodiment.

Relationships among some of the aforementioned optical parameters corresponding to the fourth preferred embodiment are as follows:

$EFL/CT1=5.30$ $CT3/AC34=8.13$ $AAG/AC34=12.00$ $CT1/CT2=1.05$ $ALT/CT1=3.55$ $CT3/CT1=0.99$ $CT3/CT4=1.63$ $ALT/CT3=3.58$

FIGS. 16(a) to 16(d) show simulation results corresponding to longitudinal spherical aberration, sagittal astigmatism aberration, tangential astigmatism aberration, and distortion aberration of the fourth preferred embodiment, respectively. It can be understood from FIGS. 16(a), 16(b), 16(c) and 16(d) that the fourth preferred embodiment is likewise able to achieve a relatively good optical performance even with the system length reduced down to 4.73 mm.

Figure 17:
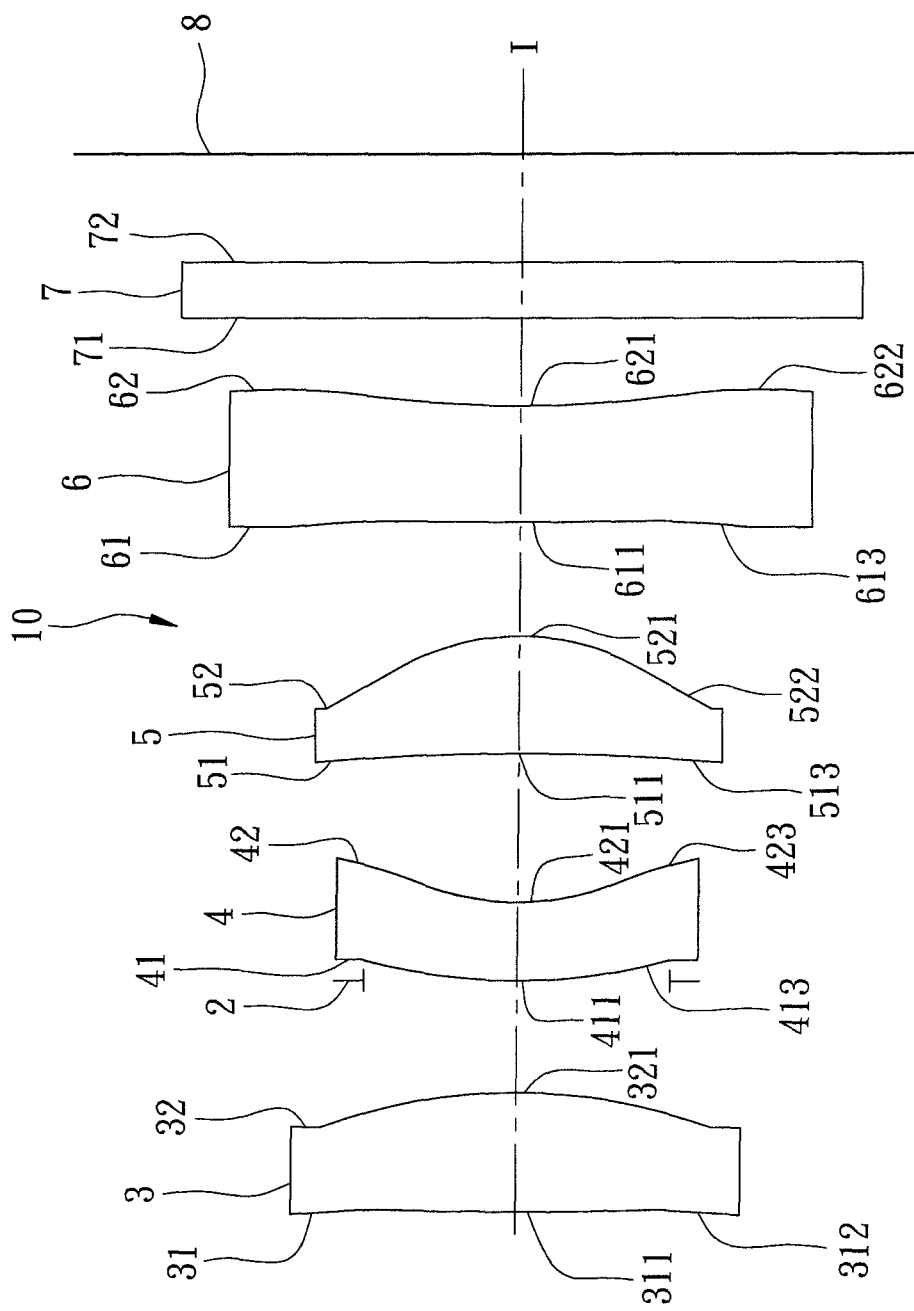
FIG. 17 is a schematic diagram that illustrates the fifth preferred embodiment of an imaging lens according to the present invention.
Figure 20:
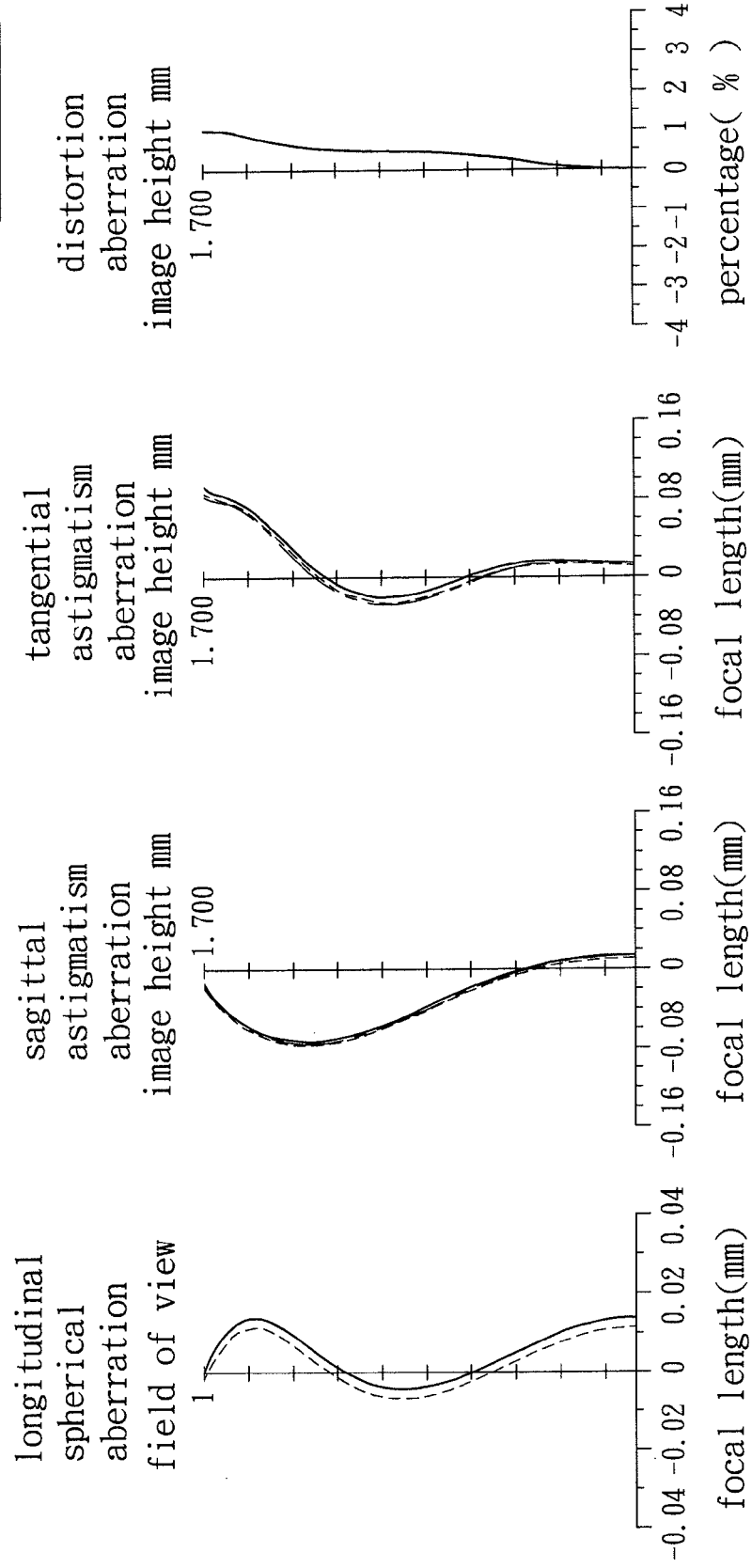
FIGS. 20(a) to 20(d) show different optical characteristics of the imaging lens of the fifth preferred embodiment.

Referring to FIG. 17, the difference between the first and fifth preferred embodiments resides in that:

The object-side surface 31 of the first lens element 3 has a concave portion 312 in a vicinity of the periphery of the first lens element 3. The object-side surface 41 of the second lens element 4 is a convex surface that has a convex portion 413 in a vicinity of the periphery of the second lens element 4. The image-side surface 42 of the second lens element 4 is a concave surface that has a concave portion 423 in a vicinity of the periphery of the second lens element 4. The object-side surface 51 of the third lens element 5 is a concave surface that has a concave portion 513 in a vicinity of the periphery of the third lens element 5. The object-side surface 61 of the fourth lens element 6 only has a concave portion 611 in a vicinity of the optical axis (I) and a convex portion 613 in a vicinity of the periphery of the fourth lens element 6.

Shown in FIG. 18 is a table that lists values of some optical parameters corresponding to the surfaces 31-61, 32-62 of the fifth preferred embodiment. The imaging lens 10 has an overall system focal length of 2.30 mm, an HFOV of 36.463°, an F-number of 2.0, and a system length of 3.44 mm.

Shown in FIG. 19 is a table that lists values of some optical parameters of the aforementioned optical relationship (1) corresponding to the fifth preferred embodiment.

Relationships among some of the aforementioned optical parameters corresponding to the fifth preferred embodiment are as follows:

$EFL/CT1=5.30$ $CT3/AC34=8.90$ $AAG/AC34=8.06$ $CT1/CT2=1.05$ $ALT/CT1=3.63$ $CT3/CT1=0.98$ $CT3/CT4=1.00$ $ALT/CT3=3.71$

FIGS. 20(a) to 20(d) show simulation results corresponding to longitudinal spherical aberration, sagittal astigmatism aberration, tangential astigmatism aberration, and distortion aberration of the fifth preferred embodiment, respectively. It can be understood from FIGS. 20 (a), 20 (b), 20 (c) and 20 (d) that the fifth preferred embodiment is likewise able to achieve a relatively good optical performance even with the system length reduced down to 3.44 mm.

Figure 21:
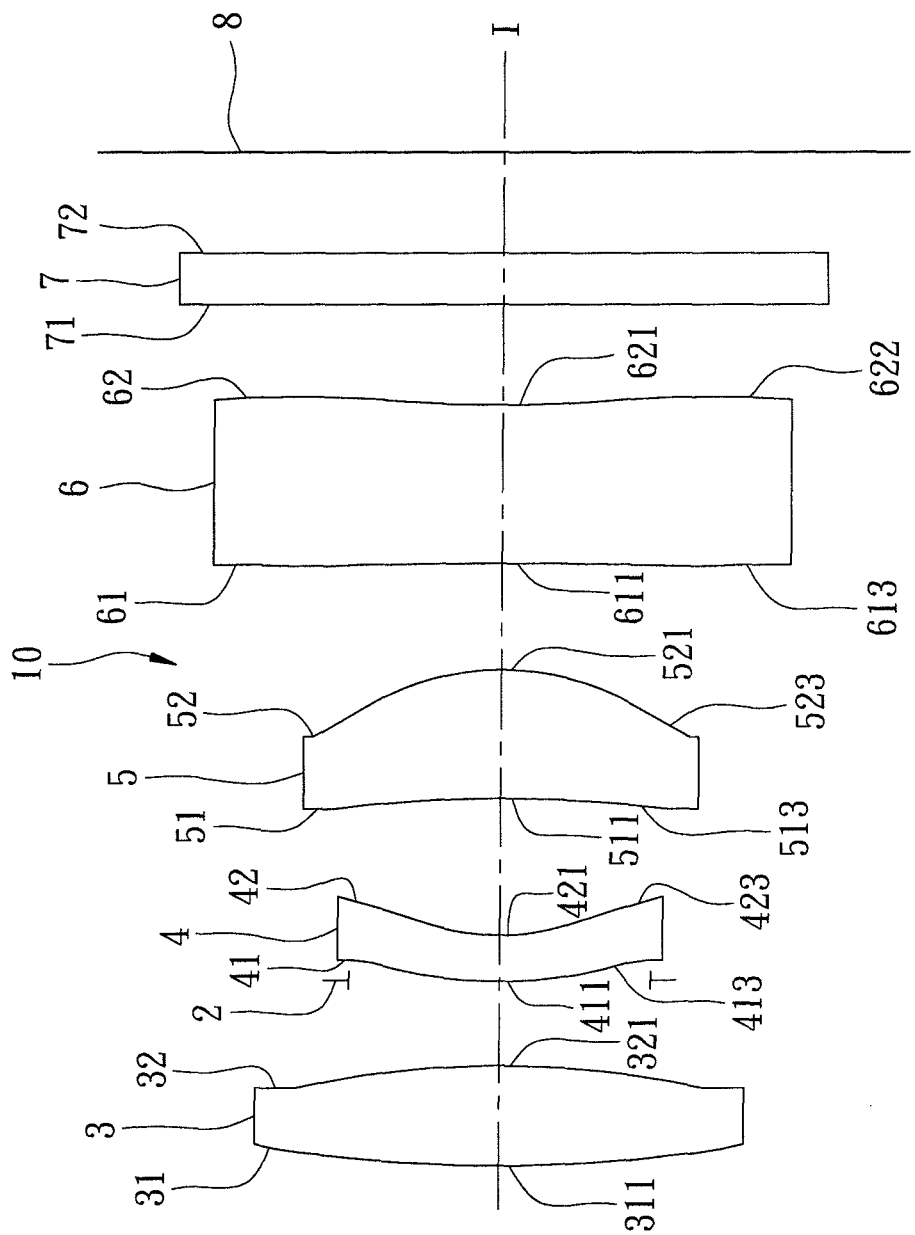
FIG. 21 is a schematic diagram that illustrates the sixth preferred embodiment of an imaging lens according to the present invention.
Figure 24:
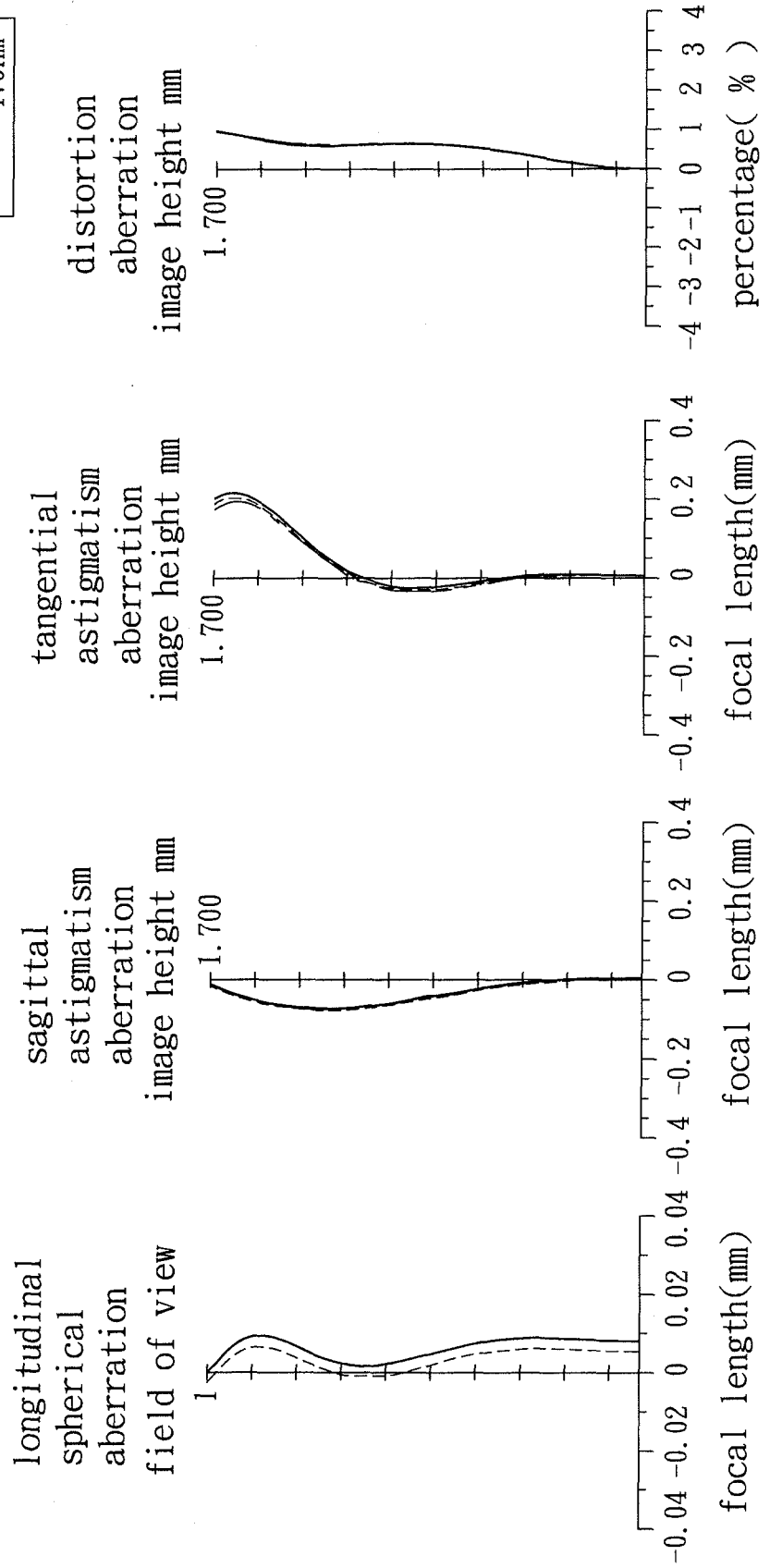
FIGS. 24(a) to 24(d) show different optical characteristics of the imaging lens of the sixth preferred embodiment.

Referring to FIG. 21, the difference between the first and sixth preferred embodiments resides in that:

The object-side surface 41 of the second lens element 4 is a convex surface that has a convex portion 413 in a vicinity of the periphery of the second lens element 4. The image-side surface 42 of the second lens element 4 is a concave surface that has a concave portion 423 in a vicinity of the periphery of the second lens element 4. The object-side surface 51 of the third lens element 5 is a concave surface that has a concave portion 513 in a vicinity of the periphery of the third lens element 5. The image-side surface 52 of the third lens element 5 is a convex surface that has a convex portion 523 in a vicinity of the periphery of the third lens element 5. The object-side surface 61 of the fourth lens element 6 only has a concave portion 611 in a vicinity of the optical axis (I) and a convex portion 613 in a vicinity of the periphery of the fourth lens element 6.

Shown in FIG. 22 is a table that lists values of some optical parameters corresponding to the surfaces 31-61, 32-62 of the sixth preferred embodiment. The imaging lens 10 has an overall system focal length of 2.71 mm, an HFOV of 32.062°, an F-number of 2.0, and a system length of 3.96 mm.

Shown in FIG. 23 is a table that lists values of some optical parameters of the aforementioned optical relationship (1) corresponding to the sixth preferred embodiment.

Relationships among some of the aforementioned optical parameters corresponding to the sixth preferred embodiment are as follows:

$EFL/CT1=6.55$ $CT3/AC34=6.68$ $AAG/AC34=8.22$ $CT1/CT2=2.26$ $ALT/CT1=4.28$ $CT3/CT1=1.28$ $CT3/CT4=0.82$ $ALT/CT3=3.35$

FIGS. 24(a) to 24(d) show simulation results corresponding to longitudinal spherical aberration, sagittal astigmatism aberration, tangential astigmatism aberration, and distortion aberration of the sixth preferred embodiment, respectively. It can be understood from FIGS. 24(a), 24(b), 24(c) and 24(d) that the sixth preferred embodiment is likewise able to achieve a relatively good optical performance even with the system length reduced down to 3.96 mm.

Figure 25:
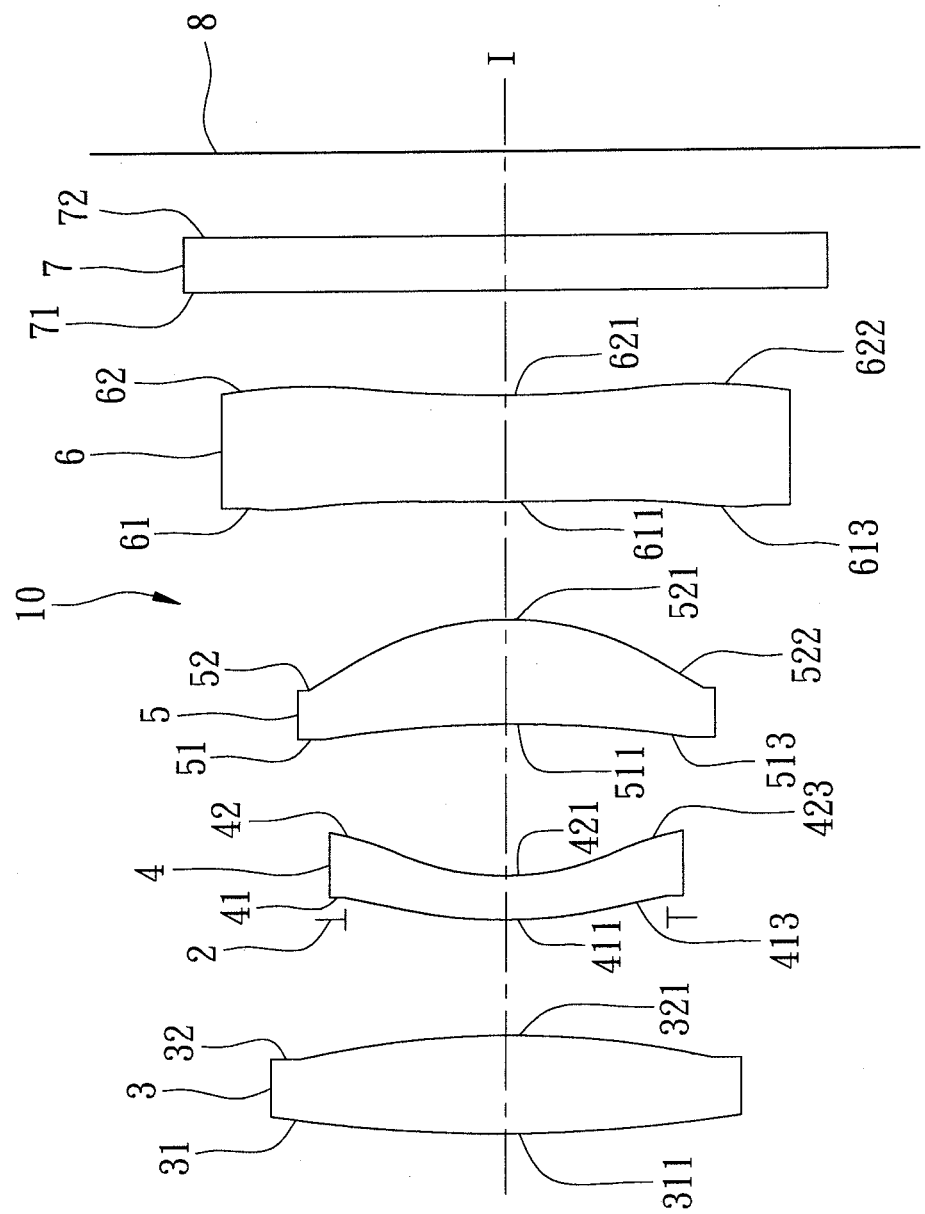
FIG. 25 is a schematic diagram that illustrates the seventh preferred embodiment of an imaging lens according to the present invention.
Figure 28:
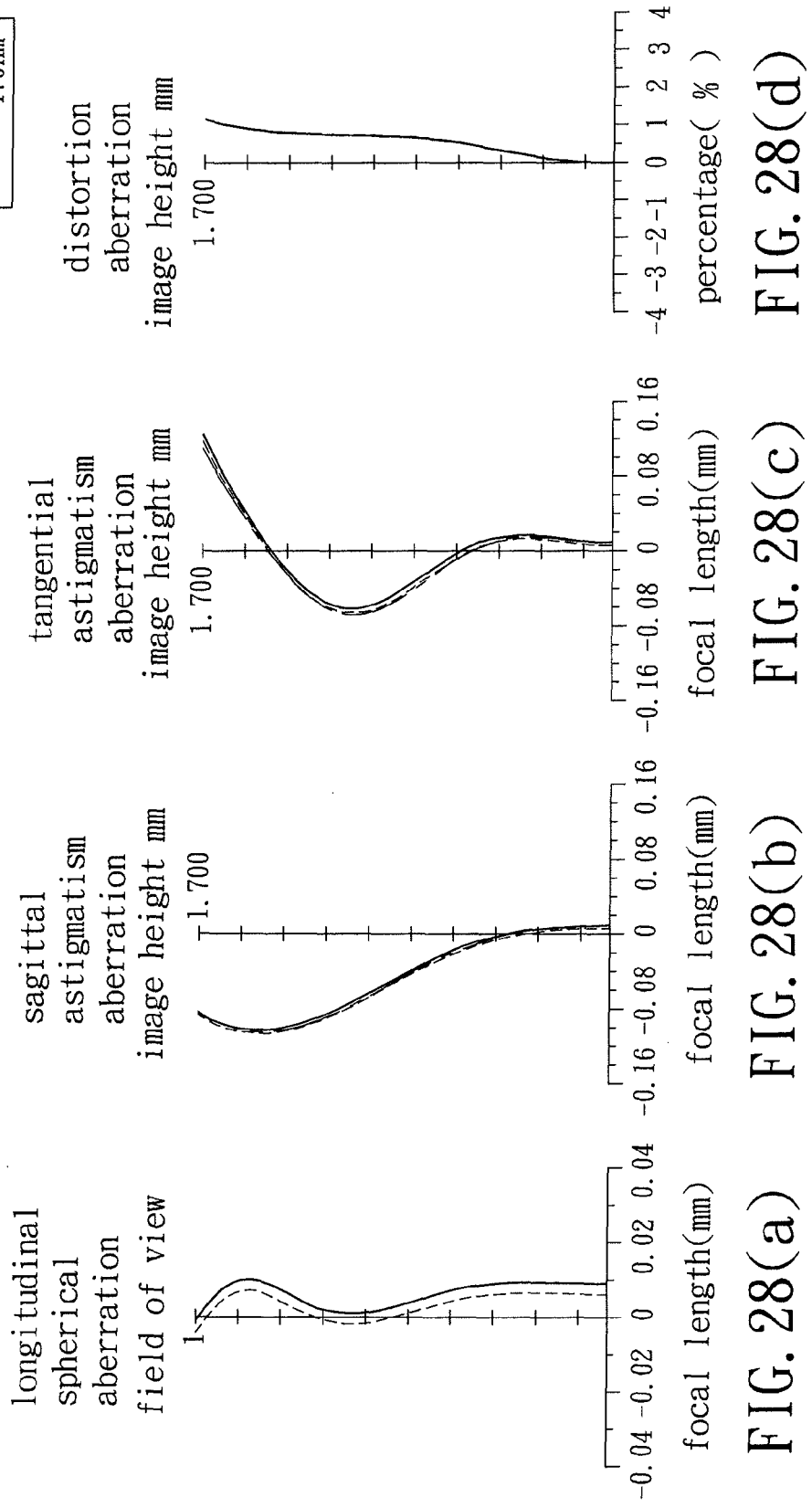
FIGS. 28(a) to 28(d) show different optical characteristics of the imaging lens of the seventh preferred embodiment.

Referring to FIG. 25, the difference between the first and seventh preferred embodiments resides in that:

The object-side surface 41 of the second lens element 4 is a convex surface that has a convex portion 413 in a vicinity of the periphery of the second lens element 4. The image-side surface 42 of the second lens element 4 is a concave surface that has a concave portion 423 in a vicinity of the periphery of the second lens element 4. The object-side surface 51 of the third lens element 5 is a concave surface that has a concave portion 513 in a vicinity of the periphery of the third lens element 5. The object-side surface 61 of the fourth lens element 6 only has a concave portion 611 in a vicinity of the optical axis (I) and a convex portion 613 in a vicinity of the periphery of the fourth lens element 6.

Shown in FIG. 26 is a table that lists values of some optical parameters corresponding to the surfaces 31-61, 32-62 of the seventh preferred embodiment. The imaging lens 10 has an overall system focal length of 2.74 mm, an HFOV of 31.782°, an F-number of 2.0, and a system length of 3.87 mm.

Shown in FIG. 27 is a table that lists values of some optical parameters of the aforementioned optical relationship (1) corresponding to the seventh preferred embodiment.

Relationships among some of the aforementioned optical parameters corresponding to the seventh preferred embodiment are as follows:

$EFL/CT1=7.01$ $CT3/AC34=4.89$ $AAG/AC34=8.00$ $CT1/CT2=2.17$ $ALT/CT1=3.63$ $CT3/CT1=1.06$ $CT3/CT4=0.96$ $ALT/CT3=3.41$

FIGS. 28(a) to 28(d) show simulation results corresponding to longitudinal spherical aberration, sagittal astigmatism aberration, tangential astigmatism aberration, and distortion aberration of the seventh preferred embodiment, respectively. It can be understood from FIGS. 28 (a), 28 (b), 28 (c) and 28 (d) that the seventh preferred embodiment is likewise able to achieve a relatively good optical performance even with the system length reduced down to 3.87 mm.

Shown in FIG. 29 is a table that lists the aforesaid relationships among some of the aforementioned optical parameters corresponding to the seven preferred embodiments for comparison. When each of the optical parameters of the imaging lens 10 according to this invention satisfies the following optical relationships, the optical performance is still relatively good even when the system length is reduced down to below 5 mm:

$$EFL/CT1 \geq 5.30 \quad (2)$$

$$CT3/AC34 \geq 4.80 \quad (3)$$

$$AAG/AC34 \geq 8.00 \quad (4)$$

$$CT1/CT2 \leq 1.50 \quad (5)$$

$$ALT/CT1 \geq 3.55 \quad (6)$$

$$CT3/CT1 \geq 1.40 \quad (7)$$

$$CT3/CT4 \leq 1.75 \quad (8)$$

$$ALT/CT3 \geq 2.65 \quad (9)$$

For reducing the system length, the thickness of each lens element may be reduced. When the imaging lens 10 satisfies optical relationship (2), EFL and CT1 will respectively fall within a suitable range with a small CT1. The small thickness of the first lens element 3 favors reduction of the system length. In addition, EFL/CT1 is preferable to range between 5.30 and 10.50.

For reducing the system length, AC34 may be reduced. Since the third lens element 5 has a relatively large optical effective radius, it may be thick enough for facilitating production. When the imaging lens 10 satisfies optical relationship (3), CT3 and AC34 will respectively fall within a suitable range. In addition, CT3/AC34 is preferable to range between 4.80 and 13.00.

For reducing the system length, distances between the lens elements may be reduced. When the imaging lens 10 satisfies optical relationship (4), AAG and AC34 will respectively fall within a suitable range with a small AC34. The small AC34 favors reduction of the system length. In addition, AAG/AC34 is preferable to range between 8.00 and 14.00.

When the imaging lens 10 satisfies optical relationship (5), CT1 and CT2 will respectively fall within a suitable range and be small. The small thicknesses of the first and second lens elements 3, 4 favor reduction of the system length. In addition, CT1/CT2 is preferable to range between 1.00 and 1.50.

When the imaging lens 10 satisfies optical relationship (6), ALT and CT1 will respectively fall within a suitable range with a small CT1. The small thickness of the first lens element 3 favors reduction of the system length. In addition, ALT/CT1 is preferable to range between 3.55 and 5.00 mm.

When the imaging lens 10 satisfies optical relationship (7), CT3 and CT1 will respectively fall within a suitable range and be small. The small thicknesses of the third and first lens elements 5, 3 favor reduction of the system length. In addition, CT3/CT1 is preferable to range between 1.40 and 1.70.

When the imaging lens 10 satisfies optical relationship (8), CT3 and CT4 will respectively fall within a suitable range and be small. The small thicknesses of the third and fourth lens elements 5, 6 favor reduction of the system length. In addition, CT3/CT4 is preferable to range between 0.75 and 1.75.

When the imaging lens 10 satisfies optical relationship (9), ALT and CT3 will respectively fall within a suitable range with a small CT3. The small thickness of the third lens element 5 favors reduction of the system length. In addition, ALT/CT3 is preferable to range between 2.65 and 3.90.

To sum up, effects and advantages of the imaging lens 10 according to the present invention are described hereinafter.

1. The positive refractive power of the first lens element 3 may enhance condensing capability, so as to reduce a chief ray angle of imaging light at a periphery of the sensor, thereby producing parallel light input and ensuring less distortion of the image.

2. Through the concave portion 421 of the image-side surface 42 of the second lens element 4, image aberration resulting from the first lens element 3 may be corrected and image quality may be ensured.

3. Through the aspherical object-side surface 61 of the fourth lens element 6, aberration at the periphery of the image may be corrected. In addition, since the imaging lens 10 satisfies EFL/CT1≥5.30, EFL and CT1 will respectively fall within a suitable range with a small CT1 to thereby favor reduction of the system length.

4. Through design of the relevant optical parameters, such as EFL/CT1, CT3/AC34, AAG/AC34, CT1/CT2, ALT/CT1, CT3/CT1, CT3/CT4, and ALT/CT3, optical aberrations, such as spherical aberration, may be reduced or even eliminated. Further, through surface design and arrangement of the lens elements 3-6, even when the system length is reduced, optical aberrations may still be reduced or eliminated, resulting in relatively good optical performance.

5. Through the aforesaid seven preferred embodiments, it is known that the system length of this invention may be reduced down to below 5 mm, so as to facilitate developing thinner relevant products with economic benefits.

Figure 30:
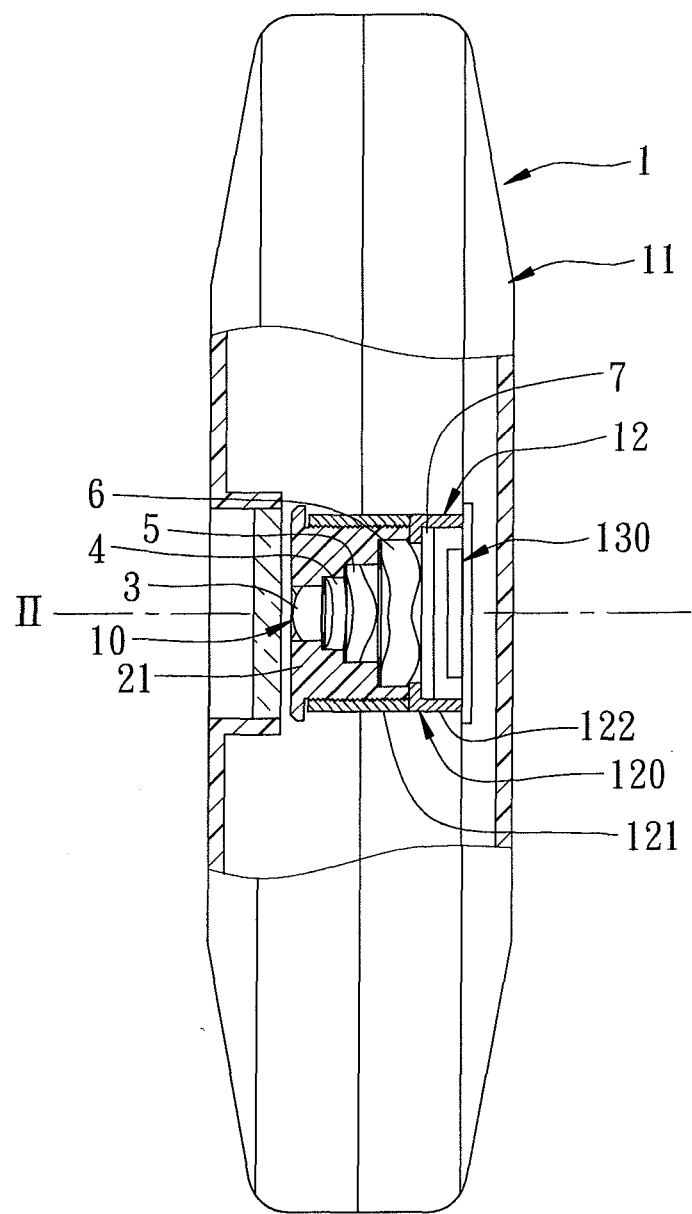
FIG. 30 is a schematic partly sectional view to illustrate a first exemplary application of the imaging lens of the present invention.

Shown in FIG. 30 is a first exemplary application of the imaging lens 10, in which the imaging lens 10 is disposed in a housing 11 of a portable electronic apparatus 1 (such as a mobile phone), and forms a part of an imaging module 12 of the portable electronic apparatus 1. The imaging module 12 includes a barrel 21 on which the imaging lens 10 is disposed, a seat unit 120 on which the barrel 21 is disposed, and an image sensor 130 disposed at the image plane 8 (see FIG. 1) and operatively associated with the imaging lens 10 for capturing images.

The seat unit 120 includes a first seat portion 121 in which the barrel 21 is disposed, and a second seat portion 122 having a portion interposed between the first seat portion 121 and the image sensor 130. The barrel 21 and the first seat portion 121 of the seat unit 120 extend along an axis (II), which coincides with the optical axis (I) of the imaging lens 10.

Figure 31:
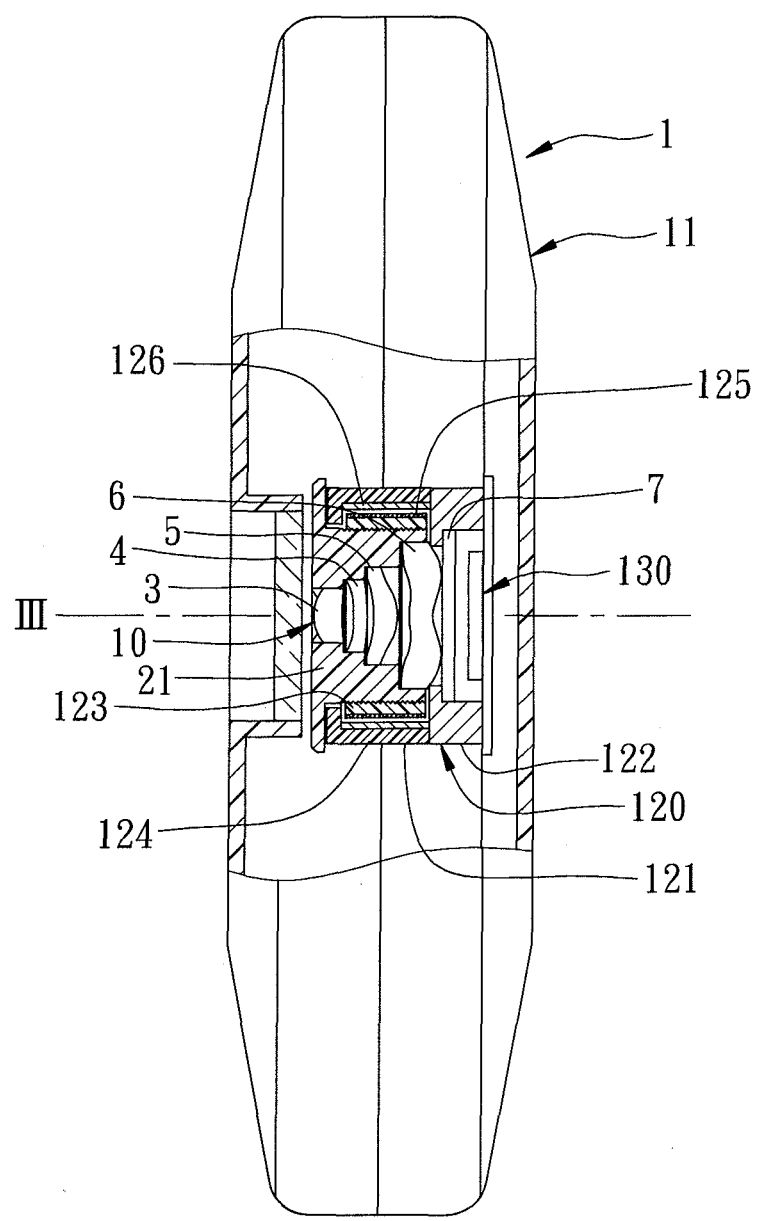
FIG. 31 is a schematic partly sectional view to illustrate a second exemplary application of the imaging lens of the present invention.

Shown in FIG. 31 is a second exemplary application of the imaging lens 10. The difference between the first and second exemplary applications resides in that, in the second exemplary application, the seat unit 120 is configured as a voice-coil motor (VCM), and the first seat portion 121 includes an inner section 123 in which the barrel 21 is disposed, an outer section 124 that surrounds the inner section 123, a coil 125 that is interposed between the inner and outer sections 123, 124, and a magnetic component 126 that is disposed between an outer side of the coil 125 and an inner side of the outer section 124.

The inner section 123 and the barrel 21, together with the imaging lens 10 therein, are movable with respect to the image sensor 130 along an axis (III), which coincides with the optical axis (I) of the imaging lens 10, for focus control of the imaging lens 10. The optical filter 7 of the imaging lens 10 is disposed at the second seat portion 122, which is disposed to abut against the outer section 124. Configuration and arrangement of other components of the portable electronic apparatus 1 in the second exemplary application are identical to those in the first exemplary application, and hence will not be described hereinafter for the sake of brevity.

By virtue of the imaging lens 10 of the present invention, the portable electronic apparatus 1 in each of the exemplary applications may be configured to have a relatively reduced overall thickness with good optical and imaging performance, so as to reduce cost of materials, and satisfy requirements of product miniaturization.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An imaging lens comprising first, second, third, and fourth lens elements arranged from an object side to an image side in the given order, each of said first, second, third, and fourth lens elements having an object-side surface facing toward the object side and an image-side surface facing toward the image side, wherein:

said first lens element has a positive refractive power, said object-side surface of said first lens element having a convex portion in a vicinity of an optical axis of said imaging lens, said image-side surface of said first lens element having a convex portion in a vicinity of the optical axis;

said object-side surface of said second lens element has a convex portion in a vicinity of the optical axis, and said image-side surface of said second lens element has a concave portion in a vicinity of the optical axis;

said fourth lens element has a negative refractive power, and said object-side surface thereof has a concave portion in a vicinity of the optical axis;

wherein said imaging lens satisfies $10.5 \geq EFL/CT1 \geq 5.30$, $CT1/CT2 \leq 1.50$, $13.0 \geq CT3/AC34 \geq 4.80$ and $1.70 \geq CT3/CT1 \geq 1.40$, where EFL represents an effective focal length of said imaging lens, CT1 represents a distance between said object-side surface and said image-side surface of said first lens element at the optical axis, CT2 represents a distance between said object-side surface and said image-side surface of said second lens element at the optical axis, CT3 represents a distance between said object-side surface and said image-side surface of said third lens element at the optical axis, and AC34 represents a distance between said image-side surface of said third lens element and said object-side surface of said fourth lens element at the optical axis, wherein said imaging lens does not include any lens element with refractive power other than said first, second, third, and fourth lens elements.

2. The imaging lens as claimed in claim 1, further satisfying $5.0 \geq ALT/CT1 \geq 3.55$, where ALT represents a sum of the distance between said object-side surface and said image-side surface of said first lens element at the optical axis, the distance between said object-side surface and said image-side surface of said second lens element at the optical axis, the distance between said object-side surface and said image-side surface of said third lens element at the optical axis, and a distance between said object-side surface and said image-side surface of said fourth lens element at the optical axis.

3. The imaging lens as claimed in claim 1, further satisfying $3.9 \geq ALT/CT3 \geq 2.65$, where ALT represents a sum of the distance between said object-side surface and said image-side surface of said first lens element at the optical axis, the distance between said object-side surface and said image-side surface of said second lens element at the optical axis, the distance between said object-side surface and said image-side surface of said third lens element at the optical axis, and a distance between said object-side surface and said image-side surface of said fourth lens element at the optical axis.

4. The imaging lens as claimed in claim 1, further satisfying $14.00 \geq AAG/AC34 \geq 8.00$, where AAG represents a sum of a distance between said image-side surface of said first lens element and said object-side surface of said second lens element at the optical axis, a distance between said image-side surface of said second lens element and said object-side surface of said third lens element at the optical axis, and the distance between said image-side surface of said third lens element and said object-side surface of said fourth lens element at the optical axis.

5. The imaging lens as claimed in claim 4, further satisfying $5.0 \geq ALT/CT1 \geq 3.55$, where ALT represents a sum of the distance between said object-side surface and said image-side surface of said first lens element at the optical axis, the distance between said object-side surface and said image-side surface of said second lens element at the optical axis, the distance between said object-side surface and said image-side surface of said third lens element at the optical axis, and a distance between said object-side surface and said image-side surface of said fourth lens element at the optical axis.

6. The imaging lens as claimed in claim 5, further satisfying $CT3/CT4 \geq 1.75$, where CT4 represents the distance between said object-side surface and said image-side surface of said fourth lens element at the optical axis.

7. The imaging lens as claimed in claim 1, wherein said object-side surface of said fourth lens element further has a convex portion in a vicinity of a periphery of said fourth lens element.

8. A portable electronic apparatus comprising:
a housing; and
an imaging module disposed in said housing, and including an imaging lens as claimed in claim 1, a barrel on which said imaging lens is disposed, a seat unit on which said barrel is disposed, and an image sensor disposed at the image side and operatively associated with said imaging lens for capturing images.

9. The portable electronic apparatus as claimed in claim 8, wherein said seat unit includes a first seat portion including an inner section in which said barrel is disposed, and an outer section that surrounds said inner section, said inner section of said first seat portion, said barrel, and said imaging lens being movable together with respect to said image sensor along the optical axis.

10. The portable electronic apparatus as claimed in claim 9, wherein said seat unit further includes a second seat portion, which is disposed between said outer section of said first seat portion and said image sensor, and which is disposed to abut against said outer section.

* * * * *